United States Patent
Nguyen

(10) Patent No.: US 10,186,113 B2
(45) Date of Patent: *Jan. 22, 2019

(54) PORTABLE INTERMEDIARY TRUSTED DEVICE

(71) Applicant: Nguyen Gaming LLC, Reno, NV (US)

(72) Inventor: Binh T. Nguyen, Reno, NV (US)

(73) Assignee: Nguyen Gaming LLC, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/876,095

(22) Filed: Jan. 19, 2018

(65) Prior Publication Data

US 2018/0144581 A1 May 24, 2018

Related U.S. Application Data

(63) Continuation of application No. 15/400,840, filed on Jan. 6, 2017, now Pat. No. 9,875,609, which is a
(Continued)

(51) Int. Cl.
G07F 17/32 (2006.01)
H04L 29/08 (2006.01)
(Continued)

(52) U.S. Cl.
CPC ...... *G07F 17/3241* (2013.01); *G07F 17/3202* (2013.01); *G07F 17/3209* (2013.01);
(Continued)

(58) Field of Classification Search
CPC ............. G07F 17/3241; G07F 17/3225; G07F 17/3218; G07F 17/3202; H04W 12/06
(Continued)

(56) References Cited

U.S. PATENT DOCUMENTS 2,033,638 A  3/1936 Koppl
2,062,923 A  12/1936 Nagy
(Continued)

FOREIGN PATENT DOCUMENTS

GB  2033638  5/1980
GB  2062923  5/1981
(Continued)

OTHER PUBLICATIONS

Benston, Liz, "Harrahs Launches iPhone App; Caesars Bypasses Check-in," Las Vegas Sun, Las Vegas, NV. Jan. 8, 2010.
(Continued)

*Primary Examiner* — Michael Cuff

(57) ABSTRACT

In one embodiment, an intermediary gaming trusted electronic device for use with an untrusted PED may include a position sensor configured to acquire position information, a memory configured to store at least game session data, and a processor configured to at least: securely communicate with a gaming apparatus via the wireless transceiver; securely communicate with the associated untrusted PED; determine whether a gaming session is permitted based on the position information; receive gaming data from the gaming apparatus if it is determined that the gaming session is permitted; transmit presentation data to the associated untrusted PED for presentation on a display of the associated PED, wherein the intermediary gaming trusted device is able to support interaction between the gaming apparatus and the associated untrusted PED so that the associated untrusted PED, when coupled to the intermediary gaming trusted device, can execute a gaming software.

27 Claims, 11 Drawing Sheets

Related U.S. Application Data continuation of application No. 13/833,116, filed on Mar. 15, 2013, now Pat. No. 9,576,425.

(51) Int. Cl.
  *H04W 4/02* (2018.01)
  *H04W 12/06* (2009.01)
  *G07F 17/34* (2006.01)

(52) U.S. Cl.
  CPC ...... *G07F 17/3218* (2013.01); *G07F 17/3223* (2013.01); *G07F 17/3225* (2013.01); *G07F 17/3227* (2013.01); *G07F 17/3251* (2013.01); *G07F 17/34* (2013.01); *H04L 67/34* (2013.01); *H04W 4/02* (2013.01); *H04W 12/06* (2013.01)

(58) Field of Classification Search
  USPC .......................................................... 463/29
  See application file for complete search history.

(56) References Cited

U.S. PATENT DOCUMENTS

| | | |
|---|---|---|
| 4,741,539 A | 5/1988 | Sutton et al. |
| 4,948,138 A | 8/1990 | Pease et al. |
| 5,067,712 A | 11/1991 | Georgilas |
| 5,429,361 A | 7/1995 | Raven et al. |
| 5,489,103 A | 2/1996 | Okamoto |
| 5,630,757 A | 5/1997 | Gagin |
| 5,655,961 A | 8/1997 | Acres et al. |
| 5,704,835 A | 1/1998 | Dietz, II |
| 5,727,786 A | 3/1998 | Weingardt |
| 5,833,537 A | 11/1998 | Barrie |
| 5,919,091 A | 7/1999 | Bell et al. |
| 5,947,820 A | 9/1999 | Morro et al. |
| 5,997,401 A | 12/1999 | Crawford |
| 6,001,016 A | 12/1999 | Walker et al. |
| 6,039,648 A | 3/2000 | Guinn et al. |
| 6,059,289 A | 5/2000 | Vancura |
| 6,089,977 A | 7/2000 | Bennett |
| 6,095,920 A | 8/2000 | Sudahiro |
| 6,110,041 A | 8/2000 | Walker et al. |
| 6,142,872 A | 11/2000 | Walker et al. |
| 6,146,273 A | 11/2000 | Olsen |
| 6,165,071 A | 12/2000 | Weiss |
| 6,231,445 B1 | 5/2001 | Acres |
| 6,270,412 B1 | 8/2001 | Crawford et al. |
| 6,290,600 B1 | 9/2001 | Glasson |
| 6,293,866 B1 | 9/2001 | Walker et al. |
| 6,353,390 B1 | 3/2002 | Beri et al. |
| 6,364,768 B1 | 4/2002 | Acres et al. |
| 6,404,884 B1 | 6/2002 | Marwell et al. |
| 6,416,406 B1 | 7/2002 | Duhamel |
| 6,416,409 B1 | 7/2002 | Jordan |
| 6,443,452 B1 | 9/2002 | Brune |
| 6,491,584 B2 | 12/2002 | Graham et al. |
| 6,505,095 B1 | 1/2003 | Kolls |
| 6,508,710 B1 | 1/2003 | Paravia et al. |
| 6,561,900 B1 | 5/2003 | Baerlocker et al. |
| 6,592,457 B1 | 7/2003 | Frohm et al. |
| 6,612,574 B1 | 9/2003 | Cole et al. |
| 6,620,046 B2 | 9/2003 | Rowe |
| 6,641,477 B1 | 11/2003 | Dietz, II |
| 6,645,078 B1 | 11/2003 | Mattice |
| 6,719,630 B1 | 4/2004 | Seelig et al. |
| 6,749,510 B2 | 6/2004 | Giobbi |
| 6,758,757 B2 | 7/2004 | Luciano, Jr. et al. |
| 6,773,345 B2 | 8/2004 | Walker et al. |
| 6,778,820 B2 | 8/2004 | Tendler |
| 6,780,111 B2 | 8/2004 | Cannon et al. |
| 6,799,032 B2 | 9/2004 | McDonnell et al. |
| 6,800,027 B2 | 10/2004 | Giobbi et al. |
| 6,804,763 B1 | 10/2004 | Stockdale et al. |
| 6,811,486 B1 | 11/2004 | Luciano, Jr. |
| 6,843,725 B2 | 1/2005 | Nelson |
| 6,846,238 B2 | 1/2005 | Wells |
| 6,848,995 B1 | 2/2005 | Walker et al. |
| 6,852,029 B2 | 2/2005 | Baltz et al. |
| 6,869,361 B2 | 3/2005 | Sharpless et al. |
| 6,875,106 B2 | 4/2005 | Weiss et al. |
| 6,884,170 B2 | 4/2005 | Rowe |
| 6,884,172 B1 | 4/2005 | Lloyd et al. |
| 6,902,484 B2 | 6/2005 | Idaka |
| 6,908,390 B2 | 6/2005 | Nguyen et al. |
| 6,913,532 B2 | 7/2005 | Bearlocher et al. |
| 6,923,721 B2 | 8/2005 | Luciano et al. |
| 6,935,958 B2 | 8/2005 | Nelson |
| 6,949,022 B1 | 9/2005 | Showers |
| 6,955,600 B2 | 10/2005 | Glavich et al. |
| 6,971,956 B2 | 12/2005 | Rowe et al. |
| 6,984,174 B2 | 1/2006 | Cannon et al. |
| 6,997,803 B2 | 2/2006 | LeMay et al. |
| 7,018,292 B2 | 3/2006 | Tracy et al. |
| 7,032,115 B2 | 4/2006 | Kashani |
| 7,033,276 B2 | 4/2006 | Walker et al. |
| 7,035,626 B1 | 4/2006 | Luciano |
| 7,037,195 B2 | 5/2006 | Schneider et al. |
| 7,048,628 B2 | 5/2006 | Schneider |
| 7,048,630 B2 | 5/2006 | Berg et al. |
| 7,063,617 B2 | 6/2006 | Brosnan et al. |
| 7,076,329 B1 | 7/2006 | Kolls |
| 7,089,264 B1 | 8/2006 | Guido et al. |
| 7,094,148 B2 | 8/2006 | Bearlocher et al. |
| 7,105,736 B2 | 9/2006 | Laakso |
| 7,111,141 B2 | 9/2006 | Nelson |
| 7,144,321 B2 | 12/2006 | Mayeroff |
| 7,152,783 B2 | 12/2006 | Chaffin |
| 7,169,041 B2 | 1/2007 | Tessmer et al. |
| 7,169,052 B2 | 1/2007 | Beaulieu et al. |
| 7,175,523 B2 | 2/2007 | Gilmore et al. |
| 7,181,228 B2 | 2/2007 | Boesch |
| 7,182,690 B2 | 2/2007 | Giobbi et al. |
| RE39,644 E | 5/2007 | Alcorn et al. |
| 7,243,104 B2 | 7/2007 | Bill |
| 7,247,098 B1 | 7/2007 | Bradford et al. |
| 7,259,718 B2 | 8/2007 | Patterson et al. |
| 7,275,989 B2 | 10/2007 | Moody |
| 7,285,047 B2 | 10/2007 | Gielb et al. |
| 7,311,608 B1 | 12/2007 | Danieli |
| 7,314,408 B2 | 1/2008 | Cannon et al. |
| 7,316,615 B2 | 1/2008 | Soltys et al. |
| 7,316,619 B2 | 1/2008 | Nelson |
| 7,318,775 B2 | 1/2008 | Brosnan et al. |
| 7,326,116 B2 | 2/2008 | O'Donovan et al. |
| 7,330,108 B2 | 2/2008 | Thomas |
| 7,346,358 B2 | 3/2008 | Wood et al. |
| 7,355,112 B2 | 4/2008 | Laakso |
| 7,384,338 B2 | 6/2008 | Rothschild et al. |
| 7,387,571 B2 | 6/2008 | Walker et al. |
| 7,393,278 B2 | 7/2008 | Gerson et al. |
| 7,396,990 B2 | 7/2008 | Lu et al. |
| 7,415,426 B2 | 8/2008 | Williams et al. |
| 7,425,177 B2 | 9/2008 | Rodgers et al. |
| 7,427,234 B2 | 9/2008 | Soltys et al. |
| 7,427,236 B2 | 9/2008 | Kaminkow et al. |
| 7,427,708 B2 | 9/2008 | Ohmura |
| 7,431,650 B2 | 10/2008 | Kessman |
| 7,448,949 B2 | 11/2008 | Kaminkow et al. |
| 7,500,913 B2 | 3/2009 | Baerlocher |
| 7,510,474 B2 | 3/2009 | Carter |
| 7,513,828 B2 | 4/2009 | Nguyen et al. |
| 7,519,838 B1 | 4/2009 | Suurballe |
| 7,559,838 B2 | 7/2009 | Walker et al. |
| 7,563,167 B2 | 7/2009 | Walker et al. |
| 7,572,183 B2 | 8/2009 | Olivas et al. |
| 7,585,222 B2 | 9/2009 | Muir |
| 7,602,298 B2 | 10/2009 | Thomas |
| 7,607,174 B1 | 10/2009 | Kashchenko et al. |
| 7,611,409 B2 | 11/2009 | Muir et al. |
| 7,637,810 B2 | 12/2009 | Amaitis et al. |
| 7,644,861 B2 | 1/2010 | Alderucci et al. |
| 7,653,757 B1 | 1/2010 | Fernald et al. |
| 7,693,306 B2 | 4/2010 | Huber |
| 7,699,703 B2 | 4/2010 | Muir et al. |

(56) References Cited

U.S. PATENT DOCUMENTS

| | | |
|---|---|---|
| 7,722,453 B2 | 5/2010 | Lark et al. |
| 7,758,423 B2 | 7/2010 | Foster et al. |
| 7,771,271 B2 | 8/2010 | Walker et al. |
| 7,780,529 B2 | 8/2010 | Rowe et al. |
| 7,780,531 B2 | 8/2010 | Englman et al. |
| 7,785,192 B2 | 8/2010 | Canterbury et al. |
| 7,811,172 B2 | 10/2010 | Asher et al. |
| 7,819,749 B1 | 10/2010 | Fish |
| 7,822,688 B2 | 10/2010 | Labron |
| 7,828,652 B2 | 11/2010 | Nguyen et al. |
| 7,828,654 B2 | 11/2010 | Carter |
| 7,828,661 B1 | 11/2010 | Fish |
| 7,850,528 B2 | 12/2010 | Wells |
| 7,874,919 B2 | 1/2011 | Paulsen et al. |
| 7,877,798 B2 | 1/2011 | Saunders et al. |
| 7,883,413 B2 | 2/2011 | Paulsen |
| 7,892,097 B2 | 2/2011 | Muir et al. |
| 7,909,692 B2 | 3/2011 | Nguyen et al. |
| 7,909,699 B2 | 3/2011 | Parrott et al. |
| 7,918,728 B2 | 4/2011 | Nguyen et al. |
| 7,927,211 B2 | 4/2011 | Rowe et al. |
| 7,927,212 B2 | 4/2011 | Hedrick et al. |
| 7,951,008 B2 | 5/2011 | Wolf et al. |
| 8,057,298 B2 | 11/2011 | Nguyen et al. |
| 8,057,303 B2 | 11/2011 | Rasmussen |
| 8,087,988 B2 | 1/2012 | Nguyen et al. |
| 8,117,608 B1 | 2/2012 | Slettehaugh |
| 8,133,113 B2 | 3/2012 | Nguyen |
| 8,182,326 B2 | 5/2012 | Speers et al. |
| 8,210,927 B2 | 7/2012 | Hedrick |
| 8,221,245 B2 | 7/2012 | Walker |
| 8,226,459 B2 | 7/2012 | Barrett |
| 8,226,474 B2 | 7/2012 | Nguyen et al. |
| 8,231,456 B2 | 7/2012 | Zielinski |
| 8,235,803 B2 | 8/2012 | Loose et al. |
| 8,282,475 B2 | 10/2012 | Nguyen et al. |
| 8,323,099 B2 | 12/2012 | Durham et al. |
| 8,337,290 B2 | 12/2012 | Nguyen et al. |
| 8,342,946 B2 | 1/2013 | Amaitis |
| 8,393,948 B2 | 3/2013 | Allen et al. |
| 8,403,758 B2 | 3/2013 | Homik |
| 8,430,745 B2 | 4/2013 | Agarwal et al. |
| 8,461,958 B2 | 6/2013 | Saenz |
| 8,469,813 B2 | 6/2013 | Joshi |
| 8,529,345 B2 | 9/2013 | Nguyen |
| 8,602,875 B2 | 12/2013 | Nguyen |
| 8,613,655 B2 | 12/2013 | Kisenwether |
| 8,613,659 B2 | 12/2013 | Nelson et al. |
| 8,696,470 B2 | 4/2014 | Nguyen |
| 8,745,417 B2 | 6/2014 | Huang et al. |
| 8,858,323 B2 | 10/2014 | Nguyen et al. |
| 8,864,586 B2 | 10/2014 | Nguyen |
| 8,942,995 B1 | 1/2015 | Kerr |
| 9,039,507 B2 | 5/2015 | Allen et al. |
| 9,235,952 B2 | 1/2016 | Nguyen |
| 9,292,996 B2 | 3/2016 | Davis et al. |
| 9,325,203 B2 | 4/2016 | Nguyen |
| 9,466,171 B2 | 10/2016 | Hornik |
| 9,483,901 B2 | 11/2016 | Nguyen |
| 9,486,697 B2 | 11/2016 | Nguyen |
| 9,486,704 B2 | 11/2016 | Nguyen |
| 9,576,425 B2 | 2/2017 | Nguyen |
| 9,626,826 B2 | 4/2017 | Nguyen |
| 9,666,021 B2 | 5/2017 | Nguyen |
| 9,672,686 B2 | 6/2017 | Nguyen |
| 9,741,205 B2 | 8/2017 | Nguyen |
| 9,811,973 B2 | 11/2017 | Nguyen |
| 9,814,970 B2 | 11/2017 | Nguyen |
| 9,842,462 B2 | 12/2017 | Nguyen |
| 9,875,606 B2 | 1/2018 | Nguyen |
| 9,875,609 B2 | 1/2018 | Nguyen |
| 2001/0004607 A1 | 6/2001 | Olsen |
| 2001/0016516 A1 | 8/2001 | Takatsuka |
| 2001/0024971 A1 | 9/2001 | Brossard |
| 2001/0047291 A1 | 11/2001 | Garahi |
| 2002/0006822 A1 | 1/2002 | Krintzman |
| 2002/0042295 A1 | 4/2002 | Walker et al. |
| 2002/0111210 A1 | 8/2002 | Luciano, Jr. et al. |
| 2002/0111213 A1 | 8/2002 | McEntee et al. |
| 2002/0113369 A1 | 8/2002 | Weingardt |
| 2002/0116615 A1 | 8/2002 | Nguyen et al. |
| 2002/0133418 A1 | 9/2002 | Hammond et al. |
| 2002/0137217 A1 | 9/2002 | Rowe et al. |
| 2002/0142825 A1 | 10/2002 | Lark et al. |
| 2002/0147047 A1 | 10/2002 | Letovsky et al. |
| 2002/0147049 A1 | 10/2002 | Carter, Sr. |
| 2002/0151366 A1 | 10/2002 | Walker et al. |
| 2002/0167536 A1 | 11/2002 | Valdes et al. |
| 2002/0183105 A1 | 12/2002 | Cannon et al. |
| 2003/0001338 A1 | 1/2003 | Bennett et al. |
| 2003/0008696 A1 | 1/2003 | Abecassis et al. |
| 2003/0027635 A1 | 2/2003 | Walker et al. |
| 2003/0064805 A1 | 4/2003 | Wells |
| 2003/0064807 A1 | 4/2003 | Walker et al. |
| 2003/0092480 A1 | 5/2003 | White et al. |
| 2003/0100361 A1 | 5/2003 | Sharpless et al. |
| 2003/0104860 A1 | 6/2003 | Cannon et al. |
| 2003/0104865 A1 | 6/2003 | Itkis et al. |
| 2003/0148809 A1 | 8/2003 | Nelson |
| 2003/0162588 A1 | 8/2003 | Brosnan et al. |
| 2003/0195024 A1 | 10/2003 | Slattery |
| 2003/0199295 A1 | 10/2003 | Vancura |
| 2003/0224852 A1 | 12/2003 | Walker et al. |
| 2003/0224854 A1 | 12/2003 | Joao |
| 2004/0002386 A1 | 1/2004 | Wolfe et al. |
| 2004/0005919 A1 | 1/2004 | Walker et al. |
| 2004/0023709 A1 | 2/2004 | Beaulieu et al. |
| 2004/0023716 A1 | 2/2004 | Gauselmann |
| 2004/0038736 A1 | 2/2004 | Bryant |
| 2004/0048650 A1 | 3/2004 | Mierau et al. |
| 2004/0068460 A1 | 4/2004 | Feeley |
| 2004/0082385 A1 | 4/2004 | Silva et al. |
| 2004/0106449 A1 | 6/2004 | Walker et al. |
| 2004/0127277 A1 | 7/2004 | Walker |
| 2004/0127290 A1 | 7/2004 | Walker et al. |
| 2004/0137987 A1 | 7/2004 | Nguyen et al. |
| 2004/0147308 A1 | 7/2004 | Walker et al. |
| 2004/0152508 A1 | 8/2004 | Lind |
| 2004/0214622 A1 | 10/2004 | Atkinson |
| 2004/0224753 A1 | 11/2004 | Odonovan et al. |
| 2004/0256803 A1 | 12/2004 | Ko |
| 2004/0259633 A1 | 12/2004 | Gentles et al. |
| 2005/0003890 A1 | 1/2005 | Hedrick et al. |
| 2005/0004980 A1 | 1/2005 | Vadjinia |
| 2005/0026696 A1 | 2/2005 | Hashimoto et al. |
| 2005/0054446 A1 | 3/2005 | Kammler |
| 2005/0101376 A1 | 5/2005 | Walker et al. |
| 2005/0101383 A1 | 5/2005 | Wells |
| 2005/0130728 A1 | 6/2005 | Nguyen et al. |
| 2005/0137014 A1 | 6/2005 | Vetelaninen |
| 2005/0181865 A1 | 8/2005 | Luciano |
| 2005/0181870 A1 | 8/2005 | Nguyen et al. |
| 2005/0181875 A1 | 8/2005 | Hoehne |
| 2005/0187020 A1 | 8/2005 | Amaitis et al. |
| 2005/0202875 A1 | 9/2005 | Murphy et al. |
| 2005/0209002 A1 | 9/2005 | Blythe et al. |
| 2005/0221881 A1 | 10/2005 | Lannert |
| 2005/0223219 A1 | 10/2005 | Gatto et al. |
| 2005/0239546 A1 | 10/2005 | Hedrick |
| 2005/0255919 A1 | 11/2005 | Nelson |
| 2005/0273635 A1 | 12/2005 | Wilcox et al. |
| 2005/0277471 A1 | 12/2005 | Russell et al. |
| 2005/0282637 A1 | 12/2005 | Gatto et al. |
| 2006/0009283 A1 | 1/2006 | Englman et al. |
| 2006/0036874 A1 | 2/2006 | Cockerille |
| 2006/0046822 A1 | 3/2006 | Kaminkow et al. |
| 2006/0046830 A1 | 3/2006 | Webb |
| 2006/0046849 A1 | 3/2006 | Kovacs |
| 2006/0068893 A1 | 3/2006 | Jaffe et al. |
| 2006/0073869 A1 | 4/2006 | LeMay et al. |
| 2006/0073897 A1 | 4/2006 | Englman et al. |
| 2006/0079317 A1 | 4/2006 | Flemming et al. |
| 2006/0148551 A1 | 7/2006 | Walker et al. |
| 2006/0189382 A1 | 8/2006 | Muir et al. |

(56) References Cited

U.S. PATENT DOCUMENTS

| | | |
|---|---|---|
| 2006/0217170 A1 | 9/2006 | Roireau |
| 2006/0217193 A1 | 9/2006 | Walker et al. |
| 2006/0247028 A1 | 11/2006 | Brosnan et al. |
| 2006/0247035 A1 | 11/2006 | Rowe et al. |
| 2006/0252530 A1 | 11/2006 | Oberberger et al. |
| 2006/0253481 A1 | 11/2006 | Guido et al. |
| 2006/0281525 A1 | 12/2006 | Borissov |
| 2006/0281541 A1 | 12/2006 | Nguyen et al. |
| 2006/0287106 A1 | 12/2006 | Jensen |
| 2007/0004510 A1 | 1/2007 | Underdahl et al. |
| 2007/0026935 A1 | 2/2007 | Wolf et al. |
| 2007/0026942 A1 | 2/2007 | Kinsley |
| 2007/0054739 A1 | 3/2007 | Amaitis et al. |
| 2007/0060254 A1 | 3/2007 | Muir |
| 2007/0060306 A1 | 3/2007 | Amaitis et al. |
| 2007/0060319 A1 | 3/2007 | Block et al. |
| 2007/0060358 A1 | 3/2007 | Amaitis et al. |
| 2007/0077981 A1 | 4/2007 | Hungate et al. |
| 2007/0087833 A1 | 4/2007 | Feeney et al. |
| 2007/0087834 A1 | 4/2007 | Moser et al. |
| 2007/0093299 A1 | 4/2007 | Bergeron |
| 2007/0129123 A1 | 6/2007 | Eryou et al. |
| 2007/0149279 A1 | 6/2007 | Norden et al. |
| 2007/0149286 A1 | 6/2007 | Bemmel |
| 2007/0159301 A1 | 7/2007 | Hirt et al. |
| 2007/0161402 A1 | 7/2007 | Ng et al. |
| 2007/0184896 A1 | 8/2007 | Dickerson |
| 2007/0184904 A1 | 8/2007 | Lee |
| 2007/0191109 A1 | 8/2007 | Crowder et al. |
| 2007/0207852 A1 | 9/2007 | Nelson et al. |
| 2007/0207854 A1 | 9/2007 | Wolf et al. |
| 2007/0238505 A1 | 10/2007 | Okada |
| 2007/0241187 A1 | 10/2007 | Alderucci et al. |
| 2007/0248036 A1 | 10/2007 | Nevalainen |
| 2007/0257430 A1 | 11/2007 | Hardy et al. |
| 2007/0259713 A1 | 11/2007 | Fiden et al. |
| 2007/0259717 A1 | 11/2007 | Mattice et al. |
| 2007/0270213 A1 | 11/2007 | Nguyen et al. |
| 2007/0275777 A1 | 11/2007 | Walker et al. |
| 2007/0275779 A1 | 11/2007 | Amaitis et al. |
| 2007/0281782 A1 | 12/2007 | Amaitis et al. |
| 2007/0281785 A1 | 12/2007 | Amaitas et al. |
| 2007/0298873 A1 | 12/2007 | Nguyen et al. |
| 2008/0015032 A1 | 1/2008 | Bradford et al. |
| 2008/0020824 A1 | 1/2008 | Cuddy et al. |
| 2008/0032787 A1 | 2/2008 | Low et al. |
| 2008/0070652 A1 | 3/2008 | Nguyen et al. |
| 2008/0070681 A1 | 3/2008 | Marks et al. |
| 2008/0076506 A1 | 3/2008 | Nguyen et al. |
| 2008/0076548 A1 | 3/2008 | Paulsen |
| 2008/0076572 A1 | 3/2008 | Nguyen et al. |
| 2008/0096650 A1 | 4/2008 | Baerlocher |
| 2008/0102956 A1 | 5/2008 | Burman et al. |
| 2008/0102957 A1 | 5/2008 | Burnman et al. |
| 2008/0113772 A1 | 5/2008 | Burrill et al. |
| 2008/0119267 A1 | 5/2008 | Denlay |
| 2008/0139306 A1 | 6/2008 | Lutnick |
| 2008/0146321 A1 | 6/2008 | Parente |
| 2008/0150902 A1 | 6/2008 | Edpalm et al. |
| 2008/0153583 A1 | 6/2008 | Huntley et al. |
| 2008/0161110 A1 | 7/2008 | Campbell |
| 2008/0167106 A1 | 7/2008 | Lutnick et al. |
| 2008/0182667 A1 | 7/2008 | Davis et al. |
| 2008/0200251 A1 | 8/2008 | Alderucci |
| 2008/0207307 A1 | 8/2008 | Cunningham, II et al. |
| 2008/0214258 A1 | 9/2008 | Brosnan et al. |
| 2008/0215319 A1 | 9/2008 | Lu |
| 2008/0234047 A1 | 9/2008 | Nguyen |
| 2008/0238610 A1 | 10/2008 | Rosenbereg |
| 2008/0248849 A1 | 10/2008 | Lutnick |
| 2008/0254878 A1 | 10/2008 | Sauders et al. |
| 2008/0254881 A1 | 10/2008 | Lutnick et al. |
| 2008/0254883 A1 | 10/2008 | Patel et al. |
| 2008/0254891 A1 | 10/2008 | Sauders et al. |
| 2008/0254892 A1 | 10/2008 | Sauders et al. |
| 2008/0254897 A1 | 10/2008 | Sauders et al. |
| 2008/0263173 A1 | 10/2008 | Weber et al. |
| 2008/0300058 A1 | 12/2008 | Sum et al. |
| 2008/0305864 A1 | 12/2008 | Kelly et al. |
| 2008/0305865 A1 | 12/2008 | Kelly et al. |
| 2008/0305866 A1 | 12/2008 | Kelly et al. |
| 2008/0311994 A1 | 12/2008 | Amaitas et al. |
| 2008/0318669 A1 | 12/2008 | Buchholz |
| 2008/0318686 A1 | 12/2008 | Crowder et al. |
| 2009/0005165 A1 | 1/2009 | Arezina et al. |
| 2009/0011822 A1 | 1/2009 | Englman |
| 2009/0029766 A1 | 1/2009 | Lutnick et al. |
| 2009/0054149 A1 | 2/2009 | Brosnan et al. |
| 2009/0077396 A1 | 3/2009 | Tsai et al. |
| 2009/0088258 A1 | 4/2009 | Saunders et al. |
| 2009/0098925 A1 | 4/2009 | Gagner et al. |
| 2009/0104977 A1 | 4/2009 | Zielinski |
| 2009/0104983 A1 | 4/2009 | Okada |
| 2009/0118002 A1 | 5/2009 | Lyons |
| 2009/0118013 A1 | 5/2009 | Finnimore et al. |
| 2009/0118022 A1 | 5/2009 | Lyons et al. |
| 2009/0124366 A1 | 5/2009 | Aoki et al. |
| 2009/0124390 A1 | 5/2009 | Seelig et al. |
| 2009/0131151 A1 | 5/2009 | Harris et al. |
| 2009/0132163 A1 | 5/2009 | Ashley et al. |
| 2009/0137255 A1 | 5/2009 | Ashley et al. |
| 2009/0138133 A1 | 5/2009 | Buchholz et al. |
| 2009/0149245 A1 | 6/2009 | Fabbri |
| 2009/0149261 A1 | 6/2009 | Chen et al. |
| 2009/0153342 A1 | 6/2009 | Thorn |
| 2009/0156303 A1 | 6/2009 | Kiely et al. |
| 2009/0176578 A1 | 7/2009 | Herrmann et al. |
| 2009/0191962 A1 | 7/2009 | Hardy et al. |
| 2009/0197684 A1 | 8/2009 | Arezina et al. |
| 2009/0216547 A1 | 8/2009 | Canora et al. |
| 2009/0219901 A1 | 9/2009 | Bull et al. |
| 2009/0221342 A1 | 9/2009 | Katz et al. |
| 2009/0227302 A1 | 9/2009 | Abe |
| 2009/0239666 A1 | 9/2009 | Hall et al. |
| 2009/0264190 A1 | 10/2009 | Davis et al. |
| 2009/0271287 A1 | 10/2009 | Halpern |
| 2009/0275410 A1 | 11/2009 | Kisenwether et al. |
| 2009/0275411 A1 | 11/2009 | Kisenwether et al. |
| 2009/0282469 A1 | 11/2009 | Lynch |
| 2009/0298468 A1 | 12/2009 | Hsu |
| 2010/0002897 A1 | 1/2010 | Keady |
| 2010/0004058 A1 | 1/2010 | Acres |
| 2010/0016069 A1 | 1/2010 | Herrmann |
| 2010/0056248 A1 | 3/2010 | Acres |
| 2010/0062833 A1 | 3/2010 | Mattice et al. |
| 2010/0062840 A1 | 3/2010 | Herrmann et al. |
| 2010/0079237 A1 | 4/2010 | Falk |
| 2010/0081501 A1 | 4/2010 | Carpenter et al. |
| 2010/0081509 A1 | 4/2010 | Burke |
| 2010/0099499 A1 | 4/2010 | Amaitis et al. |
| 2010/0106612 A1 | 4/2010 | Gupta |
| 2010/0120486 A1 | 5/2010 | DeWaal |
| 2010/0124967 A1 | 5/2010 | Lutnick et al. |
| 2010/0130276 A1 | 5/2010 | Fiden |
| 2010/0160035 A1 | 6/2010 | Herrmann |
| 2010/0160043 A1 | 6/2010 | Fujimoto et al. |
| 2010/0178977 A1 | 7/2010 | Kim et al. |
| 2010/0197383 A1 | 8/2010 | Rader et al. |
| 2010/0197385 A1 | 8/2010 | Aoki et al. |
| 2010/0203955 A1 | 8/2010 | Sylla |
| 2010/0203963 A1 | 8/2010 | Allen |
| 2010/0227662 A1 | 9/2010 | Speers et al. |
| 2010/0227670 A1 | 9/2010 | Arezine et al. |
| 2010/0227671 A1 | 9/2010 | Laaroussi |
| 2010/0227687 A1 | 9/2010 | Speers et al. |
| 2010/0234091 A1 | 9/2010 | Baerlocher et al. |
| 2010/0279764 A1 | 11/2010 | Allen et al. |
| 2010/0323780 A1 | 12/2010 | Acres |
| 2010/0325703 A1 | 12/2010 | Etchegoyen |
| 2011/0009181 A1 | 1/2011 | Speers et al. |
| 2011/0039615 A1 | 2/2011 | Acres |
| 2011/0065492 A1 | 3/2011 | Acres |
| 2011/0105216 A1 | 5/2011 | Cohen |
| 2011/0111827 A1 | 5/2011 | Nicely et al. |

(56) References Cited

U.S. PATENT DOCUMENTS

| | | |
|---|---|---|
| 2011/0111843 A1 | 5/2011 | Nicely et al. |
| 2011/0111860 A1 | 5/2011 | Nguyen |
| 2011/0118010 A1 | 5/2011 | Brune |
| 2011/0159966 A1 | 6/2011 | Gura et al. |
| 2011/0183732 A1 | 7/2011 | Block |
| 2011/0183749 A1 | 7/2011 | Allen |
| 2011/0207525 A1 | 8/2011 | Allen |
| 2011/0212711 A1 | 9/2011 | Scott |
| 2011/0212767 A1 | 9/2011 | Barclay et al. |
| 2011/0223993 A1 | 9/2011 | Allen et al. |
| 2011/0263318 A1 | 10/2011 | Agarwal et al. |
| 2011/0306400 A1 | 12/2011 | Nguyen |
| 2011/0306426 A1 | 12/2011 | Novak et al. |
| 2012/0015709 A1 | 1/2012 | Bennett et al. |
| 2012/0028703 A1 | 2/2012 | Anderson et al. |
| 2012/0028718 A1 | 2/2012 | Barclay et al. |
| 2012/0034968 A1 | 2/2012 | Watkins et al. |
| 2012/0046110 A1 | 2/2012 | Amaitis |
| 2012/0094769 A1 | 4/2012 | Nguyen et al. |
| 2012/0100908 A1 | 4/2012 | Wells |
| 2012/0108319 A1 | 5/2012 | Caputo et al. |
| 2012/0122561 A1 | 5/2012 | Hedrick |
| 2012/0122567 A1 | 5/2012 | Gangadharan et al. |
| 2012/0122584 A1 | 5/2012 | Nguyen |
| 2012/0122590 A1 | 5/2012 | Nguyen |
| 2012/0172130 A1 | 7/2012 | Acres |
| 2012/0184362 A1 | 7/2012 | Barclay et al. |
| 2012/0184363 A1 | 7/2012 | Barclay et al. |
| 2012/0190426 A1 | 7/2012 | Acres |
| 2012/0194448 A1 | 8/2012 | Rothkopf |
| 2012/0208618 A1 | 8/2012 | Frerking |
| 2012/0231885 A1 | 9/2012 | Speer, II |
| 2012/0239566 A1 | 9/2012 | Everett |
| 2012/0322563 A1 | 12/2012 | Nguyen et al. |
| 2012/0330740 A1 | 12/2012 | Pennington et al. |
| 2013/0005433 A1 | 1/2013 | Holch |
| 2013/0005443 A1 | 1/2013 | Kosta |
| 2013/0005453 A1 | 1/2013 | Nguyen et al. |
| 2013/0059650 A1 | 3/2013 | Sylla et al. |
| 2013/0065668 A1 | 3/2013 | LeMay |
| 2013/0103965 A1 | 4/2013 | Golembeski |
| 2013/0104193 A1 | 4/2013 | Gatto et al. |
| 2013/0132745 A1 | 5/2013 | Schoening et al. |
| 2013/0185559 A1 | 7/2013 | Morel |
| 2013/0196756 A1 | 8/2013 | Nguyen |
| 2013/0196776 A1 | 8/2013 | Nguyen |
| 2013/0210513 A1 | 8/2013 | Nguyen |
| 2013/0210514 A1 | 8/2013 | Nguyen |
| 2013/0210530 A1 | 8/2013 | Nguyen |
| 2013/0225279 A1 | 8/2013 | Patceg |
| 2013/0225282 A1 | 8/2013 | Williams et al. |
| 2013/0252730 A1 | 9/2013 | Joshi |
| 2013/0281188 A1 | 10/2013 | Guinn |
| 2013/0316808 A1 | 11/2013 | Nelson |
| 2014/0006129 A1 | 1/2014 | Heath |
| 2014/0057716 A1 | 2/2014 | Massing et al. |
| 2014/0087862 A1 | 3/2014 | Burke |
| 2014/0094295 A1 | 4/2014 | Nguyen |
| 2014/0094316 A1 | 4/2014 | Nguyen |
| 2014/0121005 A1 | 5/2014 | Nelson |
| 2014/0179431 A1 | 6/2014 | Nguyen |
| 2014/0274309 A1 | 9/2014 | Nguyen |
| 2014/0274319 A1 | 9/2014 | Nguyen |
| 2014/0274320 A1 | 9/2014 | Nguyen |
| 2014/0274342 A1 | 9/2014 | Nguyen |
| 2014/0274357 A1 | 9/2014 | Nguyen |
| 2014/0274360 A1 | 9/2014 | Nguyen |
| 2014/0274367 A1 | 9/2014 | Nguyen |
| 2014/0274388 A1 | 9/2014 | Nguyen |
| 2015/0089595 A1 | 3/2015 | Telles |
| 2015/0133223 A1 | 5/2015 | Carter |
| 2015/0143543 A1 | 5/2015 | Phegade |
| 2017/0116819 A1 | 4/2017 | Nguyen |
| 2017/0116823 A1 | 4/2017 | Nguyen |
| 2017/0144071 A1 | 5/2017 | Nguyen |
| 2017/0148259 A1 | 5/2017 | Nguyen |
| 2017/0148261 A1 | 5/2017 | Nguyen |
| 2017/0148263 A1 | 5/2017 | Nguyen |
| 2017/0206734 A1 | 7/2017 | Nguyen |
| 2017/0228979 A1 | 8/2017 | Nguyen |
| 2017/0337770 A1 | 11/2017 | Nguyen |

FOREIGN PATENT DOCUMENTS

| | | |
|---|---|---|
| GB | 2096376 | 10/1982 |
| GB | 2097570 | 11/1982 |
| GB | 2335524 | 9/1999 |
| GB | 12005000454 | 5/2007 |
| WO | WO 05073933 | 8/2005 |
| WO | WO 2008/027621 | 3/2008 |
| WO | WO 2009/026309 | 2/2009 |
| WO | WO 2009/062148 | 5/2009 |
| WO | WO 2010/017252 A1 | 2/2010 |

OTHER PUBLICATIONS

Finnegan, Amanda, "Casinos Connecting with Customers via iPhone Apps", May 27, 2010, Las Vegas Sun, Las Vegas, NV.
Gaming Today Staff, "Slots showcased at 2009 National Indian Gaming Assoc.", GamingToday.com, Apr. 14, 2009.
Green, Marian, "Testing Texting Casino Journal", Mar. 2, 2009.
Hasan, Ragib, et al., "A Survey of Peer-to-Peer Storage Techniques for Distributed File Systems", National Center for Supercomputing Applications, Department of Computer Science, University of Illinois at Urbana Champaign, Jun. 27, 2005.
Jones, Trahern, "Telecom-equipped drones could revolutionize wireless market", azcentral.com, http://www.azcentral.com/business/news/articles/20130424telecom-equipped-drones-could-revolutionize-wireless-market.html, downloaded Jul. 2, 2013, 2 pages.
Yancey, Kitty Bean, "Navigate Around Vegas with New iPhone Apps", USA Today, Jun. 3, 2010.
IAPS, Daily Systems LLC, 2010.
U.S. Appl. No. 12/945,888, filed Nov. 14, 2010.
U.S. Appl. No. 12/945,889, filed Nov. 14, 2010.
U.S. Appl. No. 13/622,702, filed Sep. 19, 2012.
U.S. Appl. No. 13/800,917, filed Mar. 13, 2013.
U.S. Appl. No. 13/296,182, filed Nov. 15, 2011.
U.S. Appl. No. 13/801,234, filed Mar. 13, 2013.
U.S. Appl. No. 13/801,171, filed Mar. 13, 2013.
U.S. Appl. No. 13/843,192, filed Mar. 15, 2013.
U.S. Appl. No. 13/843,087, filed Mar. 15, 2013.
U.S. Appl. No. 13/632,743, filed Oct. 1, 2012.
U.S. Appl. No. 13/632,828, filed Oct. 1, 2012.
U.S. Appl. No. 13/833,953, filed Mar. 15, 2013.
U.S. Appl. No. 12/619,672, filed Nov. 16, 2009.
U.S. Appl. No. 13/801,121, filed Mar. 13, 2013.
U.S. Appl. No. 12/581,115, filed Oct. 17, 2009.
U.S. Appl. No. 13/801,076, filed Mar. 13, 2013.
U.S. Appl. No. 13/617,717, filed Nov. 12, 2009.
U.S. Appl. No. 13/633,118, filed Oct. 1, 2012.
U.S. Appl. No. 12/797,610, filed Jun. 10, 2010.
U.S. Appl. No. 13/801,256, filed Mar. 13, 2013.
U.S. Appl. No. 12/757,968, filed Apr. 9, 2010.
U.S. Appl. No. 12/797,616, filed Jun. 10, 2010.
U.S. Appl. No. 13/557,063, filed Jul. 24, 2012.
U.S. Appl. No. 13/833,116, filed Mar. 15, 2013.
U.S. Appl. No. 13/801,271, filed Mar. 13, 2011.
Office Action for U.S. Appl. No. 12/945,888 dated Apr. 10, 2012.
Final Office Action for U.S. Appl. No. 12/945,888 dated Sep. 21, 2012.
Advisory Action for U.S. Appl. No. 12/945,888 dated Jan. 30, 2013.
Office Action for U.S. Appl. No. 12/581,115 dated Dec. 20, 2011.
Final Office Action for U.S. Appl. No. 12/581,115 dated Sep. 13, 2012.
Notice of Allowance for U.S. Appl. No. 12/581,115 dated May 24, 2013.
Office Action for U.S. Appl. No. 12/619,672 dated Dec. 20, 2011.

(56) References Cited

OTHER PUBLICATIONS

Final Office Action for U.S. Appl. No. 12/619,672 dated Nov. 6, 2012.
Office Action for U.S. Appl. No. 12/619,672 dated Mar. 7, 2013.
Office Action for U.S. Appl. No. 12/617,717 dated Oct. 4, 2011.
Office Action for U.S. Appl. No. 12/617,717 dated Apr. 4, 2012.
Advisory Action for U.S. Appl. No. 12/617,717 dated Jun. 12, 2011.
Office Action for U.S. Appl. No. 12/617,717 dated Jun. 17, 2013.
Office Action for U.S. Appl. No. 12/797,610 dated Dec. 8, 2011.
Final Office Action for U.S. Appl. No. 12/797,610 dated Jun. 6, 2012.
Office Action for U.S. Appl. No. 12/797,610 dated Feb. 26, 2013.
Office Action for U.S. Appl. No. 12/757,968, dated May 9, 2012.
Final Office Action for U.S. Appl. No. 12/757,968, dated Nov. 29, 2012.
Office Action for U.S. Appl. No. 12/757,968, dated Apr. 25, 2013.
Office Action for U.S. Appl. No. 12/797,616 dated Mar. 15, 2012.
Final Office Action for U.S. Appl. No. 12/797,616 dated Oct. 13, 2012.
Office Action for U.S. Appl. No. 12/797,616 dated Feb. 13, 2013.
Final Office Action for U.S. Appl. No. 12/797,616 dated May 8, 2013.
Office Action for U.S. Appl. No. 13/296,182 dated Dec. 5, 2012.
Brochure, 5000 Ft. Inc., 1 page, Nov. 2010.
Frontier Fortune game, email notification, MGM Resorts Intl., Aug. 9, 2013.
"Getting Back in the Game: Geolocation Can Ensure Compliance with New iGaming Regulations", White Paper, Quova, Inc., 2010.
Notice of Allowance of U.S. Appl. No. 12/619,672, dated Aug. 23, 2013.
Office Action for U.S. Appl. No. 13/633,118, dated Sep. 20, 2013.
Office Action for U.S. Appl. No. 13/801,256, dated Jul. 2, 2013.
Notice of Allowance for U.S. Appl. No. 12/619,672, dated Oct. 3, 2013.
Notice of Allowance for U.S. Appl. No. 12/757,968, dated Oct. 11, 2013.
Final Office Action for U.S. Appl. No. 12/797,610, dated Jul. 10, 2013.
Notice of Allowance for U.S. Appl. No. 12/757,968, dated Dec. 18, 2013.
Office Action for U.S. Appl. No. 12/945,889, dated Dec. 18, 2013.
Office Action for U.S. Appl. No. 13/632,828, dated Jul. 30, 2013.
Restriction Requirement for U.S. Appl. No. 13/801,256, dated Dec. 30, 2013.
Office Action for U.S. Appl. No. 13/801,171, dated Dec. 26, 2013.
Office Action for U.S. Appl. No. 13/801,234, dated Jan. 10, 2014.
Final Office Action for U.S. Appl. No. 13/296,182, dated Feb. 12, 2014.
Office Action for U.S. Appl. No. 12/617,717, dated Feb. 25, 2014.
Office Action for U.S. Appl. No. 13/801,076, dated Mar. 28, 2014.
Final Office Action for U.S. Appl. No. 13/633,118, dated Apr. 3, 2014.
Office Action for U.S. Appl. No. 13/843,192, dated Apr. 3, 2014.
Office Action for U.S. Appl. No. 13/632,743, dated Apr. 10, 2014.
Office Action for U.S. Appl. No. 13/801,121, dated Apr. 11, 2014.
Final Office Action for U.S. Appl. No. 12/945,889, dated Jun. 30, 2014.
Notice of Allowance for U.S. Appl. No. 12/617,717, dated Jul. 14, 2014.
Office Action for U.S. Appl. No. 13/801,121, dated Sep. 24, 2014.
Office Action for U.S. Appl. No. 13/801,171, dated Sep. 22, 2014.
Office Action for U.S. Appl. No. 13/801,234, dated Oct. 1, 2014.
Office Action for U.S. Appl. No. 13/801,271, dated Oct. 31, 2014.
Final Office Action for U.S. Appl. No. 13/843,192, dated Oct. 21, 2014.
Office Action for U.S. Appl. No. 13/632,743, dated Oct. 23, 2014.
Office Action for U.S. Appl. No. 12/945,889, dated Oct. 23, 2014.
Office Action for U.S. Appl. No. 13/632,828, dated Nov. 7, 2014.
Office Action for U.S. Appl. No. 12/797,610, dated Dec. 15, 2014.
Final Office Action for U.S. Appl. No. 12/945,889, dated Feb. 12, 2015.
Final Office Action for U.S. Appl. No. 13/801,171, dated Mar. 16, 2015.
Office Action for U.S. Appl. No. 13/833,116, dated Mar. 27, 2015.
Office Action for U.S. Appl. No. 13/632,828, dated Apr. 10, 2015.
Final Office Action for U.S. Appl. No. 13/801,121, dated Apr. 21, 2015.
Final Office Action for U.S. Appl. No. 13/557,063, dated Apr. 28, 2015.
Office Action for U.S. Appl. No. 13/296,182, dated Jun. 5, 2015.
Office Action for U.S. Appl. No. 13/843,192, dated Jun. 19, 2015.
Office Action for U.S. Appl. No. 12/797,610, dated Jul. 14, 2015.
Final Office Action for U.S. Appl. No. 13/833,953, dated Jul. 17, 2015.
Notice of Allowance for U.S. Appl. No. 12/945,889, dated Jul. 22, 2015.
Office Action for U.S. Appl. No. 12/797,616, dated Aug. 10, 2015.
Final Office Action for U.S. Appl. No. 13/801,234, dated Aug. 14, 2015.
Final Office Action for U.S. Appl. No. 13/833,116, dated Sep. 24, 2015.
Office Action for U.S. Appl. No. 13/801,121, dated Oct. 2, 2015.
Office Action for U.S. Appl. No. 14/017,150, dated Oct. 7, 2015.
Office Action for U.S. Appl. No. 14/017,159, dated Oct. 7, 2015.
Office Action for U.S. Appl. No. 13/801,271 dated Oct. 19, 2015.
Office Action for U.S. Appl. No. 14/211,536 dated Oct. 19, 2015.
Final Office Action for U.S. Appl. No. 13/632,828, dated Oct. 22, 2015.
Office Action for U.S. Appl. No. 14/217,066, dated Dec. 17, 2015.
Notice of Allowance for U.S. Appl. No. 13/557,063, dated Dec. 23, 2015.
Office Action for U.S. Appl. No. 13/296,182, dated Dec. 23, 2015.
Final Office Action for U.S. Appl. No. 13/843,192, dated Dec. 30, 2015.
Office Action for U.S. Appl. No. 13/801,076, dated Jan. 11, 2016.
Office Action for U.S. Appl. No. 12/945,888, dated Jan. 22, 2016.
Final Office Action for U.S. Appl. No. 12/797,616, dated Jun. 12, 2016.
Office Action for U.S. Appl. No. 13/843,087, dated Feb. 25, 2016.
Office Action for U.S. Appl. No. 13/800,917, dated Feb. 25, 2016.
Advisory Action for U.S. Appl. No. 13/632,828, dated Feb. 25, 2016.
Office Action for U.S. Appl. No. 13/801,234, dated Mar. 8, 2016.
Office Action for U.S. Appl. No. 14/216,986, dated Mar. 9, 2016.
Final Office Action for U.S. Appl. No. 13/801,271, dated Mar. 11, 2016.
Office Action for U.S. Appl. No. 13/622,702, dated Mar. 22, 2016.
Final Office Action for U.S. Appl. No. 13/633,118, dated Mar. 24, 2016.
Final Office Action for U.S. Appl. No. 14/189,948, dated Apr. 6, 2016.
Final Office Action for U.S. Appl. No. 12/797,610, dated Apr. 21, 2016.
Final Office Action for U.S. Appl. No. 14/017,150, dated Apr. 26, 2016.
Final Office Action for U.S. Appl. No. 13/801,121, dated May 11, 2016.
Final Office Action for U.S. Appl. No. 14/017,159, dated Jun. 6, 2016.
Office Action for U.S. Appl. No. 13/801,171, dated Jun. 6, 2016.
Office Action for U.S. Appl. No. 13/843,192, dated Jun. 9, 2016.
Final OA for U.S. Appl. No. 12/945,888, dated Jun. 28, 2016.
Notice of Allowance for U.S. Appl. No. 13/833,953, dated Jul. 6, 2016.
Final Office Action for U.S. Appl. No. 13/801,171, dated May 21, 2014.
Final Office Action for U.S. Appl. No. 13/801,234, dated May 22, 2014.
Office Action for U.S. Appl. No. 14/211,536, dated Jul. 13, 2016.
Notice of Allowance for U.S. Appl. No. 13/801,076, dated Jul. 11, 2016.
Office Action for U.S. Appl. No. 13/296,182, dated Jul. 20, 2016.

(56) References Cited

OTHER PUBLICATIONS

Restriction Requirement for U.S. Appl. No. 13/296,182, dated Oct. 12, 2012.
Advisory Action for U.S. Appl. No. 13/296,182, dated May 8, 2014.
Advisory Action for U.S. Appl. No. 13/843,192, dated May 8, 2014.
Notice of Allowance for U.S. Appl. No. 13843,192, dated Aug. 10, 2016.
Office Action for U.S. Appl. No. 14/217,066, dated Dec. 22, 2016.
Final Office Action for U.S. Appl. No. 14/216,986, dated Sep. 23, 2016.
Office Action for U.S. Appl. No. 14/017,159, dated Sep. 23, 2016.
Office Action for U.S. Appl. No. 3/632,743, dated Sep. 23, 2016.
Final Office Action for U.S. Appl. No. 13/801,234, dated Oct. 14, 2016.
Final Office Action for U.S. Appl. No. 13/843,087, dated Oct. 13, 2016.
Final Office Action for U.S. Appl. No. 13/622,702, dated Oct. 13, 2016.
Office Action for U.S. Appl. No. 14/189,948, dated Nov. 7, 2016.
Final Office Action for U.S. Appl. No. 14/211,536, dated Mar. 14, 2014.
Notice of Allowance for U.S. Appl. No. 13/833,116, dated Oct. 11, 2016.
Notice of Allowance for U.S. Appl. No. 13/801,271, dated Dec. 2, 2016.
Notice of Allowance for U.S. Appl. No. 12/797,610, dated Dec. 7, 2016.
Notice of Allowance for U.S. Appl. No. 13/632,828, dated Dec. 16, 2016.
Final Office Action for U.S. Appl. No. 13/801,171, dated Dec. 19, 2016.
Notice of Allowance for U.S. Appl. No. 14/211,536, dated Dec. 28, 2016.
Notice of Allowance for U.S. Appl. No. 13/801,256, dated Jan. 20, 2017.
Office Action for U.S. Appl. No. 13/800,917, dated Feb. 3, 2017.
Final Office Action for U.S. Appl. No. 12/797,616, dated Feb. 10, 2017.
Office Action for U.S. Appl. No. 12/945,888, dated Feb. 28, 2017.
Final Office Action for U.S. Appl. No. 14/189,948, dated Mar. 17, 2017.
Office Action for U.S. Appl. No. 15/400,840, dated Mar. 10, 2017.
Notice of Allowance for U.S. Appl. No. 13/801,121, dated Mar. 29, 2017.
Office Action for U.S. Appl. No. 15/270,333, dated Mar. 30, 2017.
Office Action for U.S. Appl. No. 15/402,945, dated Apr. 5, 2017.
Office Action for U.S. Appl. No. 15/271,488, dated Apr. 19, 2017.
Final Office Action for U.S. Appl. No. 14/217,066, dated Apr. 21, 2017.
Office Action for U.S. Appl. No. 14/216,986 dated Apr. 26, 2017.
Office Action for U.S. Appl. No. 13/801,171, dated Jun. 14, 2017.
Office Action for U.S. Appl. No. 14/017,159, dated Jun. 29, 2017.
Notice of Allowance for U.S. Appl. No. 15/270,333, dated Jul. 5, 2017.
Final Office Action for U.S. Appl. No. 13/800,917, dated Jul. 13, 2017.
Notice of Allowance for U.S. Appl. No. 13/801,234, dated Jul. 5, 2017.
Notice of Allowance for U.S. Appl. No. 14/217,066, dated Jul. 14, 2017.
Final Office Action for U.S. Appl. No. 14/518,909, dated Jul. 19, 2017.
Final Office Action for U.S. Appl. No. 13/801,121, dated Sep. 15, 2016.
Advisory Action for U.S. Appl. No. 13/801,121, dated Jul. 17, 2015.
Advisory Action for U.S. Appl. No. 13/801,121, dated Jul. 19, 2016.
Notice of Allowance for U.S. Appl. No. 15/293,751, dated Aug. 4, 2017.
Advisory Action for U.S. Appl. No. 14/189,948, dated Jul. 28, 2017.
Final OA for U.S. Appl. No. 13/801,256, dated Aug. 15, 2014.
Final OA for U.S. Appl. No. 13/801,256, dated Feb. 18, 2015.
Advisory Action for U.S. Appl. No. 13/801,256, dated Dec. 5, 2014.
Office Action for U.S. Appl. No. 13/801,256, dated Jan. 12, 2016.
Final Office Action for U.S. Appl. No. 13/801,256, dated Aug. 16, 2016.
Office Action for U.S. Appl. No. 13/622,702, dated Aug. 31, 2017.
Office Action for U.S. Appl. No. 12/945,888, dated Sep. 1, 2017.
Office Action for U.S. Appl. No. 14/017,150, dated Sep. 7, 2017.
Notice of Allowance for U.S. Appl. No. 14/189,948, dated Sep. 13, 2017.
Office Action for U.S. Appl. No. 15/138,086, dated Oct. 19, 2017.
Notice of Allowance for U.S. Appl. No. 15/402,945 dated Nov. 21, 2017.
Final Office Action for U.S. Appl. No. 13/801,171, dated Dec. 13, 2017.
Final Office Action for U.S. Appl. No. 15/271,488, dated Dec. 21, 2017.
Office Action for U.S. Appl. No. 15/671,133, dated Dec. 22, 2017.
Final Office Action for U.S. Appl. No. 14/216,986, dated Dec. 26, 2017.
Restriction Requirement for U.S. Appl. No. 15/427,307, dated Jan. 17, 2018.

PORTABLE INTERMEDIARY TRUSTED DEVICE

CROSS-REFERENCE TO RELATED APPLICATIONS

This application is continuation of U.S. patent application Ser. No. 15/400,840, filed Jan. 6, 2017, and entitled "PORTABLE INTERMEDIARY TRUSTED DEVICE", which is hereby incorporated herein by reference for all purposes, and which in turn is a continuation of U.S. patent application Ser. No. 13/833,116, filed Mar. 15, 2013, and entitled "PORTABLE INTERMEDIARY TRUSTED DEVICE", which is hereby incorporated herein by reference for all purposes.

This application is also related to U.S. application Ser. No. 13/833,953, filed Mar. 15, 2013, and entitled "GAMING DEVICE DOCKING STATION," which is hereby incorporated by reference herein in its entirety for all purposes.

BACKGROUND OF THE INVENTION

Gaming establishments continually try new methods to keep patrons in its establishment in order to increase profits. With more and more patrons using PEDs, mobile gaming is one way to increase profits. However, games of chance may not be played on unknown and untrusted PEDs.

OVERVIEW

A network-based gaming system may support interaction between intermediary gaming trusted devices and PEDs and/or gaming machines so that games of chance are able to be securely presented to the user(s). The intermediary gaming trusted device is able to support a secure and controlled interaction between a gaming apparatus and an associated unknown, untrusted PED so that the associated untrusted PED, when coupled to the intermediary gaming trusted device, becomes a trusted PED and can execute gaming software.

In one embodiment, an intermediary gaming trusted electronic device for use with an associated untrusted PED may include a position sensor configured to acquire position information of the untrusted PED, a memory configured to store at least game session data, a wireless transceiver, and a processor configured to at least: (i) securely communicate with a gaming apparatus via the wireless transceiver; (ii) securely communicate with the associated untrusted PED; (iii) determine whether a gaming session is permitted based on the position information; (iv) receive gaming data from the gaming apparatus if it is determined that the gaming session is permitted; and (v) transmit presentation data to the associated untrusted PED for presentation on a display of the associated PED, the presentation data associated with the received gaming data, wherein the intermediary gaming trusted device is able to support interaction between the gaming apparatus and the associated untrusted PED so that the associated untrusted PED, when coupled to the intermediary gaming trusted device, can execute a gaming software.

In another embodiment, an intermediary gaming trusted device for use with an associated untrusted portable electronic device (PED), the device including a position sensor configured to acquire position information of the PED, a memory configured to store at least game session data, a wireless transceiver, and a processor configured to at least: (i) securely communicate with the gaming apparatus via the wireless transceiver; (ii) securely communicate with the associated untrusted PED; (iii) determine whether a gaming session is permitted based on the position information; (iv) receive gaming data from the gaming apparatus if it is determined that the gaming session is permitted; and (v) transmit presentation data to the associated untrusted PED for presentation on a display of the associated PED, the presentation data being associated with the received gaming data, wherein the associated untrusted PED can be trusted to display presentation data so long as the intermediary gaming trusted device is coupled thereto.

In one embodiment, a system for playing a wagering game includes a portable electronic device (PED) having a display to display presentation data associated with gaming data, an intermediary gaming trusted device configured to securely communicate with the PED via a physical or wireless means, and a gaming apparatus configured to securely communicate with the intermediary gaming trusted device to transmit the gaming data to the intermediary gaming trusted device, wherein the intermediary gaming trusted device is configured to transmit the presentation data to the PED to allow a user of the PED to execute gaming software.

The present invention provides other hardware configured to perform the methods of the invention, as well as software stored in a machine-readable medium (e.g., a tangible storage medium) to control devices to perform these methods. These and other features will be presented in more detail in the following detailed description of the invention and the associated figures.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings.

DESCRIPTION OF EXAMPLE EMBODIMENTS

The present disclosure relates generally to gaming systems. More particularly, the present disclosure relates to use of a portable electronic device (PED) in a gaming system and even more particularly use of a PED in a gaming system with an intermediary trusted device.

Embodiments are described herein in the context of a portable intermediary trusted device. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 1:
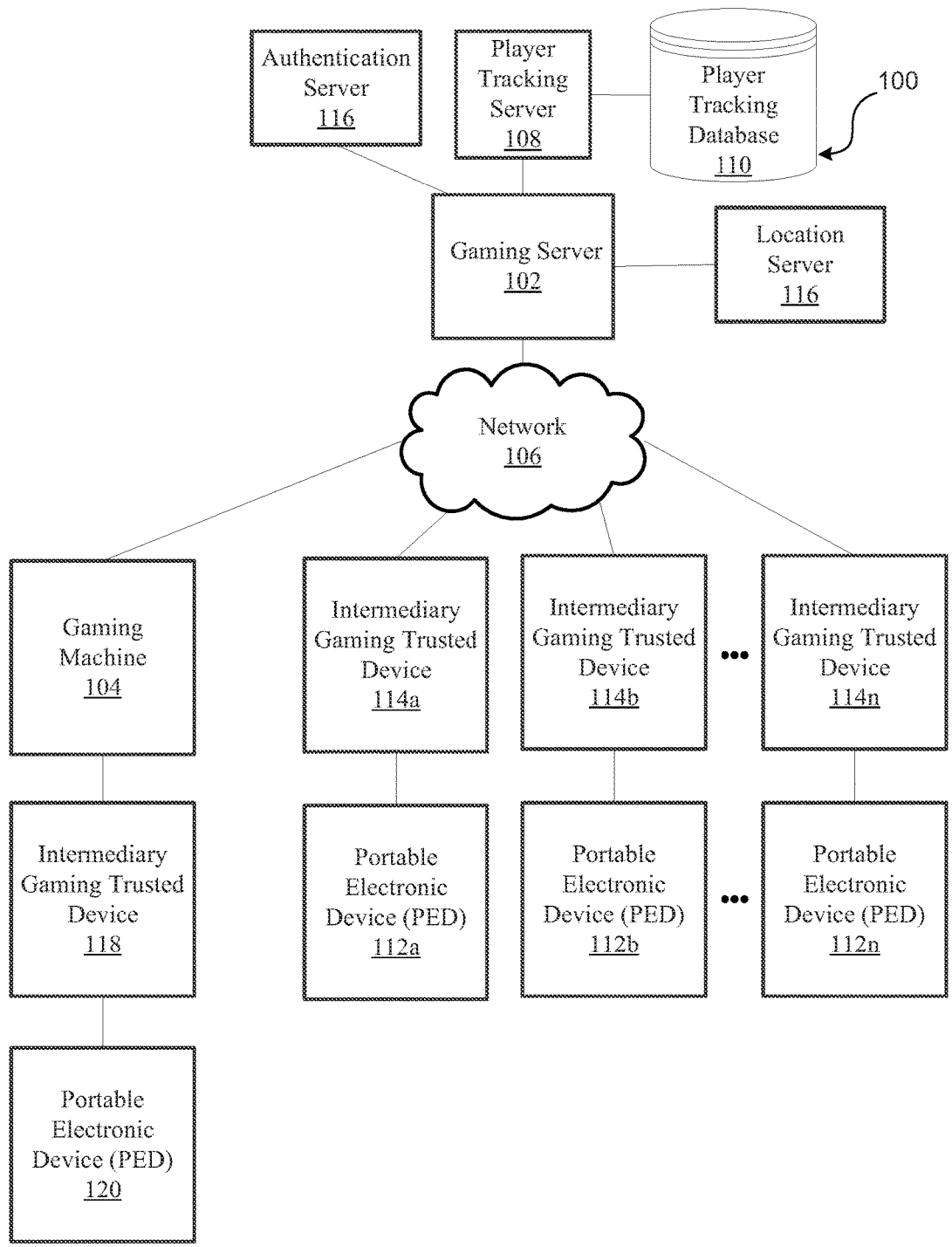
FIG. 1 illustrates an example block diagram of a network-based gaming system.

FIG. 1 illustrates an example block diagram of a network-based gaming system. The network-based gaming system 100 may support interaction between intermediary gaming trusted devices and one or more unknown, untrusted PEDs and/or gaming machines so that games of chance are able to be securely presented to the user(s). Initially, PEDs are untrusted devices and are supported or capable to play games of chance. However, once connected to an intermediary gaming trusted device, a PED becomes or is otherwise transformed into a trusted PED and is able to be used to execute gaming software.

The network-based gaming system 100 may include at least one intermediary gaming trusted device 114a-n (where n is an integer). The intermediary gaming trusted device 114a-n may be associated with a PED 112a-n via a physical or wireless connection. Although each intermediary gaming trusted device is illustrated as connecting to one PED, the intermediary gaming trusted device may connect to more than one PED and thus acts as a trusted connection hub for multiple PED's. The PED 112a-n may be any portable device having a display such as, for example, portable telephones, laptops, computers, notebooks, tablets, media players, and the like. Wireless connections may be any known wireless methods such as a 3G wireless technology, 4G wireless technology, Bluetooth, wireless universal serial bus, near-field magnetic or communication sensor, Fire Wire, WiMax, IEEE 802.11x technology, radio frequency, narrow-beam infrared (IR) sensor, RFID tag, WiFi, vibration sensor or any other known wireless methods. Wired connections may be any known connection using a wire. The connection between the intermediary gaming trusted device and PED creates a secured pairing environment. Once paired, either a short-range (e.g. Bluetooth) or a long-range (e.g. WiFi) wireless communication tether (e.g. wireless leash) may be established and maintained during the wireless communication session.

The intermediary gaming trusted device 114a-n may be configured to communicate with a gaming server 102 via a network 106 through a wired or wireless connection. In the same or another embodiment, the intermediary gaming trusted device 118 associated with the PED 120 may also be configured to communicate with a gaming machine 104 through a wired or wireless connection. The gaming machine 104 may then connect to the gaming server 102 via network 106 also through a wired or wireless connection. Wireless connections may be any known wireless methods such as a 3G wireless technology, 4G wireless technology, Bluetooth, wireless universal serial bus, near-field magnetic, Fire Wire, WiMax, IEEE 802.11 technology, radio frequency, or any other known wireless methods. Wired connections may be any known connection using a wire.

The gaming server 102 may be configured to communicate with a player tracking server 108, location server 120, and an authentication server 116. The player tracking server 108 may communicate with a player tracking database 110 to obtain tracked player information such as player preferences, games of chance the player likes to play, entertainment the player enjoys, accumulated and used points, number of wins and losses, and any other similar player information.

The authentication sever 116 may be used to authenticate and/or verify the player, the intermediary gaming trusted device 114a-n, 118, the PED 112a-n, 120, the gaming machine 104, or perform any other authentication or verification functions. Any known authentication method may be used, such as public-private key authentication algorithms, random number generators, authentication keys, location authentication, and the like.

Each intermediary gaming trusted device 114a-n, 120 may be assigned to at least one PED 112a-n, 118. Although each intermediary gaming trusted device 114a-n, 118 is illustrated as being associated with one PED 112a-n, 120, this is not meant to be limiting as the intermediary gaming trusted device 114a-n, 118 may be assigned to more than one PED 112a-n, 120 and acts as a trusted gaming hub. Initially, PEDs are unknown and untrusted devices not capable of playing games of chance. However, once connected to an intermediary gaming trusted device, the PED becomes or is otherwise transformed into a trusted PED and is able to be used to play games of chance. Each intermediary gaming trusted device 114a-n, 118 may have a connector to connect to the PED 112a-n, 120. The connector is further illustrated and described in detail with reference to FIGS. 2A-C and 3, however, example connectors may be a universal serial bus, male connector, wire, or any other connector able to connect the intermediary gaming trusted device 114a-n, 118 with the PED 112a-n, 120 to transmit and receive data.

The intermediary gaming trusted device 114a-n, 118 may be configured to communicate with the authentication server 116. The intermediary gaming trusted device 114a-n, 118 may then, in turn, authenticate or verify the user of PED 112a-n, 120. The user of the PED 112a-n, 120 may be authenticated and/or verified though any known authentication and verification methods such as, for example, biometric verification (i.e. voice recognition, retinal scan, fingerprint verification, and the like), username, password, account number, and the like. Authentication of the user may also include authentication via a web-application associated with the gaming establishment and/or uploading authentication software from the intermediary gaming trusted device 114a-n, 118 to the PED 112a-n, 120. In another embodiment, the user of the PED 112a-n, 120 may also obtain the intermediary gaming trusted device 114a-n, 118 from a gaming establishment personnel. The gaming establishment personnel may then authenticate and/or verify the user as well as associate the intermediary gaming trusted device 114a-n, 118 to the PED 112a-n, 120.

Once authenticated, the intermediary gaming trusted device 114*a-n*, 118 may receive gaming data from the gaming server 102. The gaming data may include gaming information or gaming establishment information. Gaming information may include, for example, player tracking information, gaming options, data to play a game of chance, funding information or options in order to play the games of chance, pay tables, and the like. The gaming establishment information may include, for example, advertisements (e.g. buffet coupons, movie trailers, and the like), tournament information, room booking information, entertainment information, and the like.

The intermediary gaming trusted device 114*a-n*, 118 may control and review the communication between the PED and the gaming server 102. The intermediary gaming trusted device 114*a-n*, 118 may be configured to determine if the communication meets any desired rules or regulations. For example, if the user selects a "Cash Out" option on the PED 112*a-n*, 120 for $100,000.00, but the maximum amount to be cashed out is $2,000, the intermediary gaming trusted device 114*a-n*, 118 may prevent the user from cashing out.

The intermediary gaming trusted device 114*a-n*, 118 may transmit the gaming data to the PED 114*a-n*, 120 or to the gaming machine 104. The intermediary gaming trusted device 114*a-n*, 118 may enable the PED 112*a-n*, 120 or the gaming machine 104 to display the gaming data. For example, if the gaming data is to play a game of chance, the game of chance may be displayed on a display of the PED 112*a-n*, 120 or the gaming machine 104. The game of chance may be, for example, poker, black jack, roulette, bingo, keno, video slot machine games, or any other game of chance. The intermediary gaming trusted device 114*a-n*, 118 may be configured to receive data from the PED 114*a-n*, 120 or the gaming machine 104 that is inputted by the user. The received data may then be transmitted from the intermediary gaming trusted device 114*a-n*, 118 to the gaming server 102 via the network 106 for processing. The received data may be transmitted to the gaming server 102 dynamically or periodically. In other words, the received data may be transmitted to the gaming server 102 dynamically or in real-time as it is received by the intermediary gaming trusted device 114*a-n*, 118. Alternatively, the received data may be buffered and transmitted to the gaming server 102 periodically such as every minute, ten (10) minutes, hour, or any other pre-defined time period.

The gaming server 102 may then process and store the gaming data received from the intermediary gaming trusted device 114*a-n*, 118. The stored gaming data may be used in case of a power outage, weak or lost signals, or any other loss of gaming data. Once the received gaming data is processed, the gaming server 102 may transmit additional gaming data in response to the processed gaming data. The additional gaming data may be transmitted, in real-time on an as needed basis or in a bulk transfer mode for batch operations, to the intermediary gaming trusted device 114*a-n*, 118 for display on the PED 114*a-n*, 120 or the gaming machine 104 so that the player can continue to play the game of chance or receive additional gaming information. For instance, a video poker game on the gaming machine 104 may receive one card at a time, or five cards at a time, or ten cards at a time. In another example, a 5-reel slot game may receive one random number seed at a time, or 100 random number seeds for the next 20 games. Player input may include a selection of one of a plurality of games of chance, player preference options, selection of advertisement information, or the like.

The gaming server 102 may be configured to determine the location of the intermediary gaming trusted device 114*a-n*, 118 using location server 120. Any known position or location methods may be used to determine the location of the intermediary gaming trusted device 114*a-n*, 118 such as cellular positioning, triangulation, global positioning systems, or any other location or positioning determining method. The position or location of the intermediary gaming trusted device 114*a-n*, 118 may be obtained periodically or at any pre-defined time period. For example, the intermediary gaming trusted device 114*a-n*, 118 may be pinged every thirty (30) seconds, minute, ten minutes, hour, or any periodic time interval for its location.

A user may be prevented from playing a game or using the intermediary trusted gaming device 114*a-n*, 118 due to location, time, establishment rules, government rules, or any other restrictions the gaming establishment may have or impose. For example, if the user decides to leave the gaming establishment and the location server 120 determines that the intermediary gaming trusted device 114*a-n*, 118 is outside the gaming establishment, the gaming server 102 may cause to the intermediary gaming trusted device to cease performing any gaming activities. In another embodiment, if the intermediary trusted gaming device 114*a-n*, 118 is in a restricted location such as the kids club, the intermediary trusted gaming device 114*a-n* may cease performing any gaming activities. In still another example, if the player has played or lost a certain amount of money, the intermediary trusted gaming device 114*a-n* may cease performing any gaming activities.

FIGS. 2A-3C illustrate example embodiments of an intermediary trusted gaming device. The intermediary trusted gaming device may be a portable electronic device that a user may carry around. The intermediary trusted gaming device may be any size, but is preferably sized to fit in a pocket, purse, or the like.

Figure 2A:
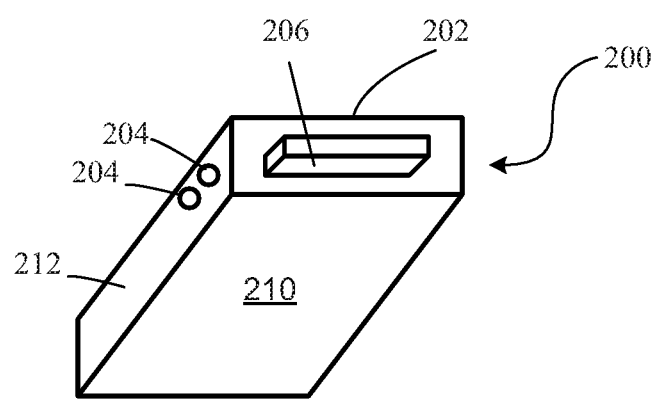
FIGS. 2A-2C illustrate example embodiments of an intermediary trusted gaming device.

FIG. 2A illustrates one example of an intermediary trusted gaming device. The intermediary trusted gaming device 200 may include a housing 210. The housing 210 may have at least a status indicator, such as one light emitting diode (LED) 204. The LED 204 may be any color and any shape. The LED 204 may be configured to turn on or off to inform the user of its activities. For example, a green LED 204 may inform the user that the intermediary trusted gaming device 200 is properly connected to a PED, such as PED 112*a-n*, 118 illustrated in FIG. 1. In another example, a red LED 204 may inform the user that the intermediary trusted gaming device 200 is low on battery or is not properly connected to the PED, such as PED 112*a-n*, 118 illustrated in FIG. 1. In still another example, the LED 204 may flash to inform the user that the intermediary trusted gaming device 200 is receiving information either from the PED and/or gaming server, such as gaming server 102 illustrated in FIG. 1. Although the LED 204 is illustrated as being positioned on side 212 of the intermediary trusted gaming device 200, this is not intended to be limiting as the LED 204 may located anywhere on housing 210. Although the status indicator is described as a simple LED indicator, it maybe implemented as a LCD display for user-friendly text or graphical information.

Intermediary trusted gaming device 200 may have connector 206 configured to connect to a PED, such as PED 112*a-n*, 118 illustrated in FIG. 1. Connector 206 may be configured to receive or transmit signals or data from/to the PED. As illustrated, connector 206 may be a USB connector. Although illustrated as being positioned on side 202 of the intermediary trusted gaming device 200, this is not intended to be limiting as the connector 206 may located anywhere on housing 210.

Figure 2B:
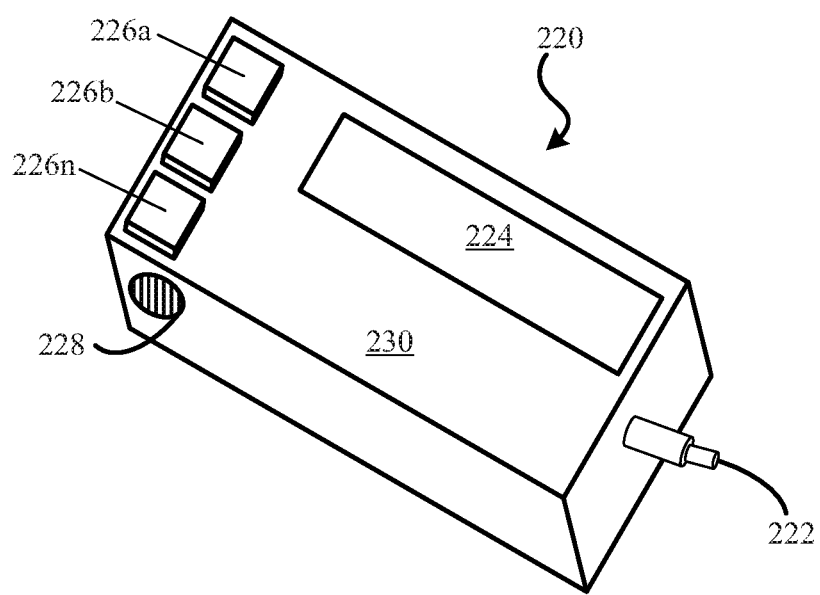

FIG. 2B illustrates another example intermediary trusted gaming device. The intermediary trusted gaming device 220 may include a housing 230, display 224, microphone 228, buttons 226*a-n*, and connector 222. Connector 222, similar to connector 206 illustrated in FIG. 2A, may be configured to connect to a PED. Display 224 positioned on the housing may be used to display any desired information. For example, the display may display a request for a username and/or password, inform the user that the intermediary trusted gaming device 220 is properly connected to the PED, such as PED 112*a-n*, 118 illustrated in FIG. 1, or any other desired information.

In one embodiment, display 224 may be a projector. For example, if the image on the display of the PED is too small, the player may want to view a larger image to play the game of chance. The display may be configured to project the game of chance in a larger image and allow the player to play the game of chance. The image may be projected on a table, wall, or any other surface or non-surface.

The microphone 228 may be configured to receive audio input, such as, for example, voice input. For example, if the user is unable to input his password on the PED, for any reason, the user may speak his password into the microphone. In another example, the microphone 228 may be used to receive the user's voice to authenticate the user. Instead of the microphone 228, other biometric sensors such as a camera or a fingerprint sensor may also be used for authenticating the user of the PED.

Buttons 226*a-n* may be used for any desired purpose or reason. For example, buttons 226*a-n* may be used to turn the intermediary trusted gaming device 220 on or off. In another example, button 226*a-n* may be used to signal a gaming establishment personnel that the player would like to order a drink. In another embodiment, buttons 226*a-n* maybe a numeric keypad, or an alphanumeric keypad, or a directional keypad, and the like.

Figure 2C:
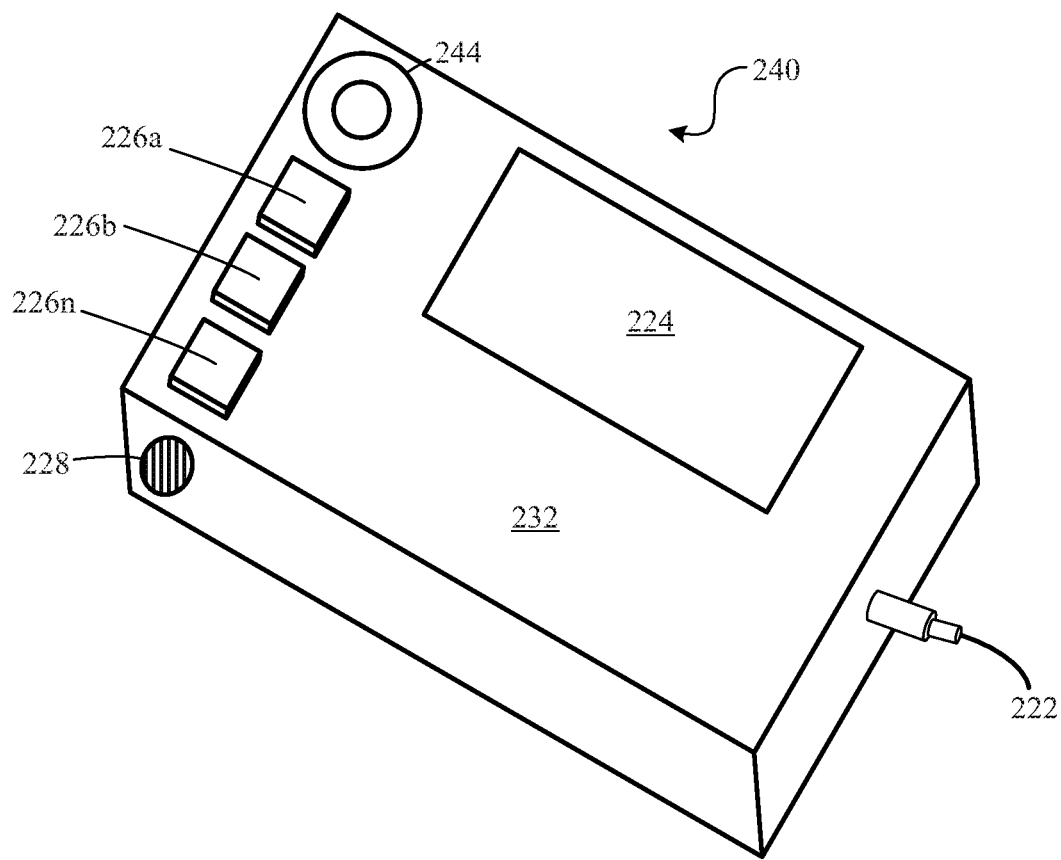

FIG. 2C illustrates still another example of an intermediary trusted gaming device. Intermediary trusted gaming device 240 is similar to intermediary trusted gaming device 220 illustrated in FIG. 2B, except that intermediary trusted gaming device 240 includes a camera 244. Camera 244 may be used for any desired purpose or reason. For example, camera 244 may be used to authenticate the player (e.g. facial recognition, compare a picture of the player stored in the player tracking database to a picture taken by the intermediary trusted gaming device 240, and the like). In another example, camera 244 may be used to allow a player to take a picture for upload to the player's player tracking account. In still another example, camera 244 may be configured to recognize player gestures to allow the player to play the games of chance as opposed to using the PED to input data.

Although intermediary trusted gaming device 200, 220, 240 is illustrated as having a rectangular shape, this is for illustrating purposes and is not intended to be limiting. Intermediary trusted gaming device 200, 220, 240 may be formed of any desired shape such as a circle, triangle, star, shape of the gaming establishment's logo, and the like. Additionally, indicia may be printed anywhere on the housing of intermediary trusted gaming device 200, 220, 240. For example, the intermediary trusted gaming device 200, 220, 240 may be personalized for the player. In another example, the intermediary trusted gaming device 200, 220, 240 may include indicia of any sponsor, the gaming establishment, or any other desired indicia.

Figure 3A:
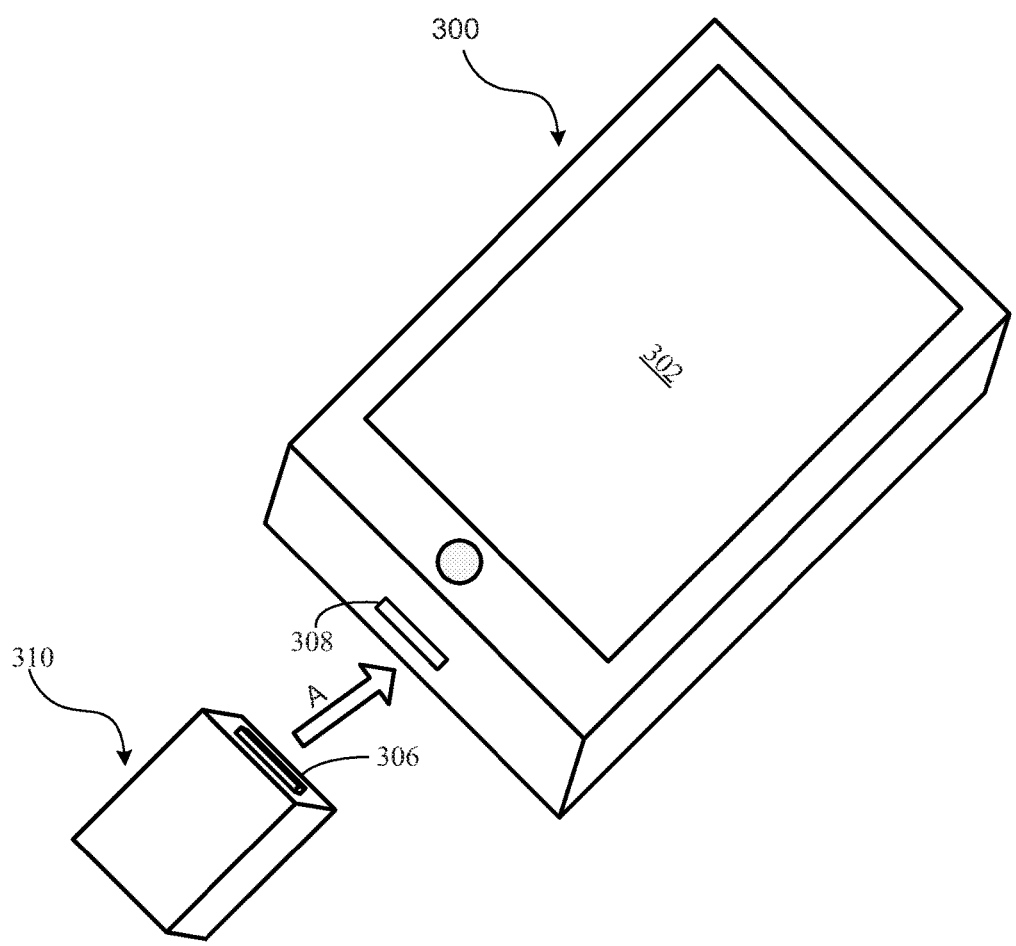
FIGS. 3A and 3B illustrate example uses of the intermediary trusted gaming device.
Figure 3B:
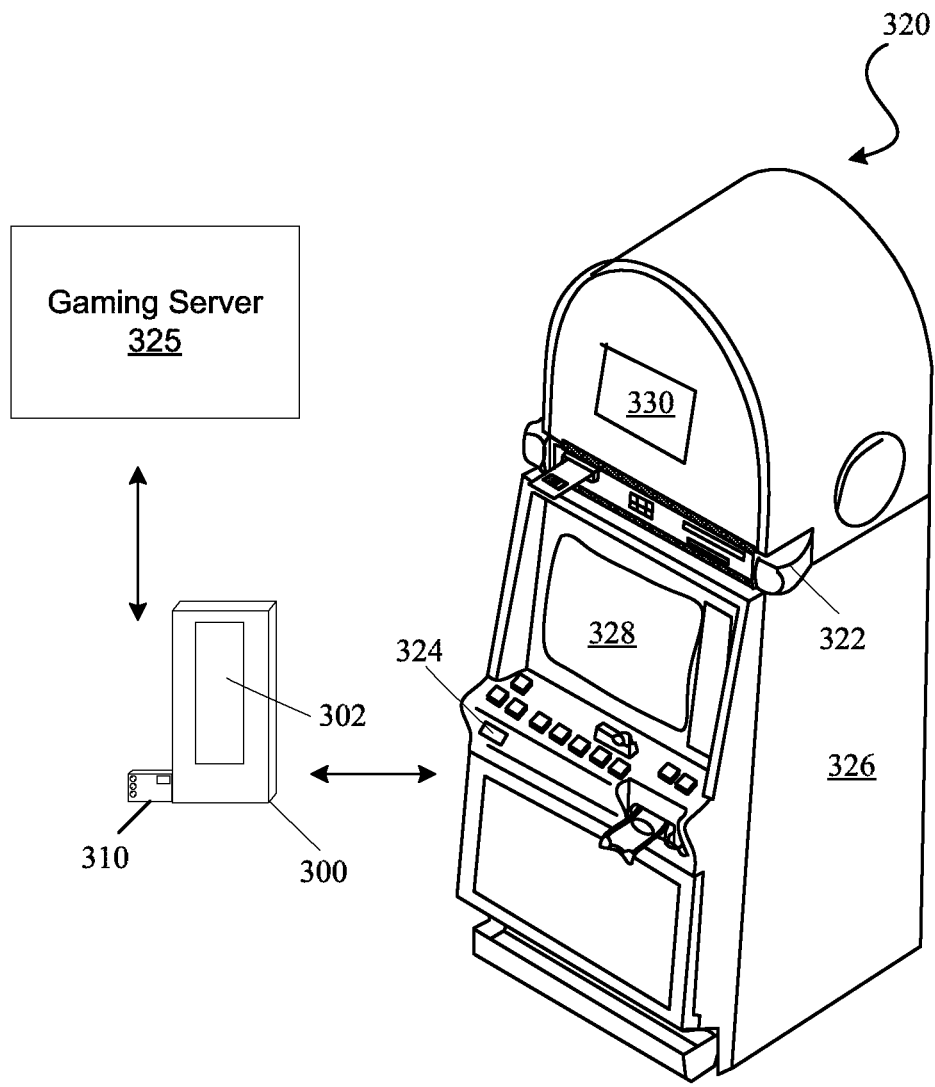

FIGS. 3A and 3B illustrate example uses of the intermediary trusted gaming device. Referring to FIG. 3A, the intermediary trusted gaming device 310 may have a connector 306 configured to connect into any input/output (I/O) port 308 of the PED 300 via arrow A. When connected properly, PED 300 may have a display 302 to display gaming data received from the intermediary trusted gaming device 310. Although illustrated with the use of a connector 306, this is for illustrative purposes only and not meant to be limiting as the intermediary trusted gaming device 310 may also be configured to communicate with the PED 300 via any known wireless methods. In other words, intermediary trusted gaming device 310 need not be physically connected to the PED 300 to communicate with the PED 300.

Referring now to FIG. 3B, intermediary trusted gaming device 310 may connect to a gaming machine 320. In one embodiment, intermediary trusted gaming device 310 may be coupled to a PED 300 and be configured to communicate with the gaming device 310 wirelessly. For example, the player may want to play the game of chance at the sports bar while watching a basketball game. However, after the basketball game ends, the player may then want to sit and continue to play the game of chance on gaming machine 320.

In another embodiment, intermediary trusted gaming device 310 may be coupled to the gaming machine 320 itself at I/O port 324. For example, the PED 300 may be low on batteries but the player would like to continue to play his game of chance. Thus, the intermediary trusted gaming device 310 may be coupled to the gaming machine 320 at I/O port 324. Although the I/O port is illustrated on housing 326 of gaming machine 320, this is for illustrative purposes only and not meant to be limiting. For example, I/O port 324 may also be positioned on a player tracking device 322 or in any other position on housing 326.

Whether connected to the PED 300 or gaming machine 320, intermediary trusted gaming device 310 may transmit or receive gaming data to or from gaming server 325 via any known wireless methods. If the intermediary trusted gaming device 310 is connected to the PED 300, the gaming data may be displayed on display 302 of the PED 300. If the intermediary trusted gaming device 310 is connected to the gaming machine 320, the gaming data may be displayed on display 328 or secondary display 330.

Figure 4:
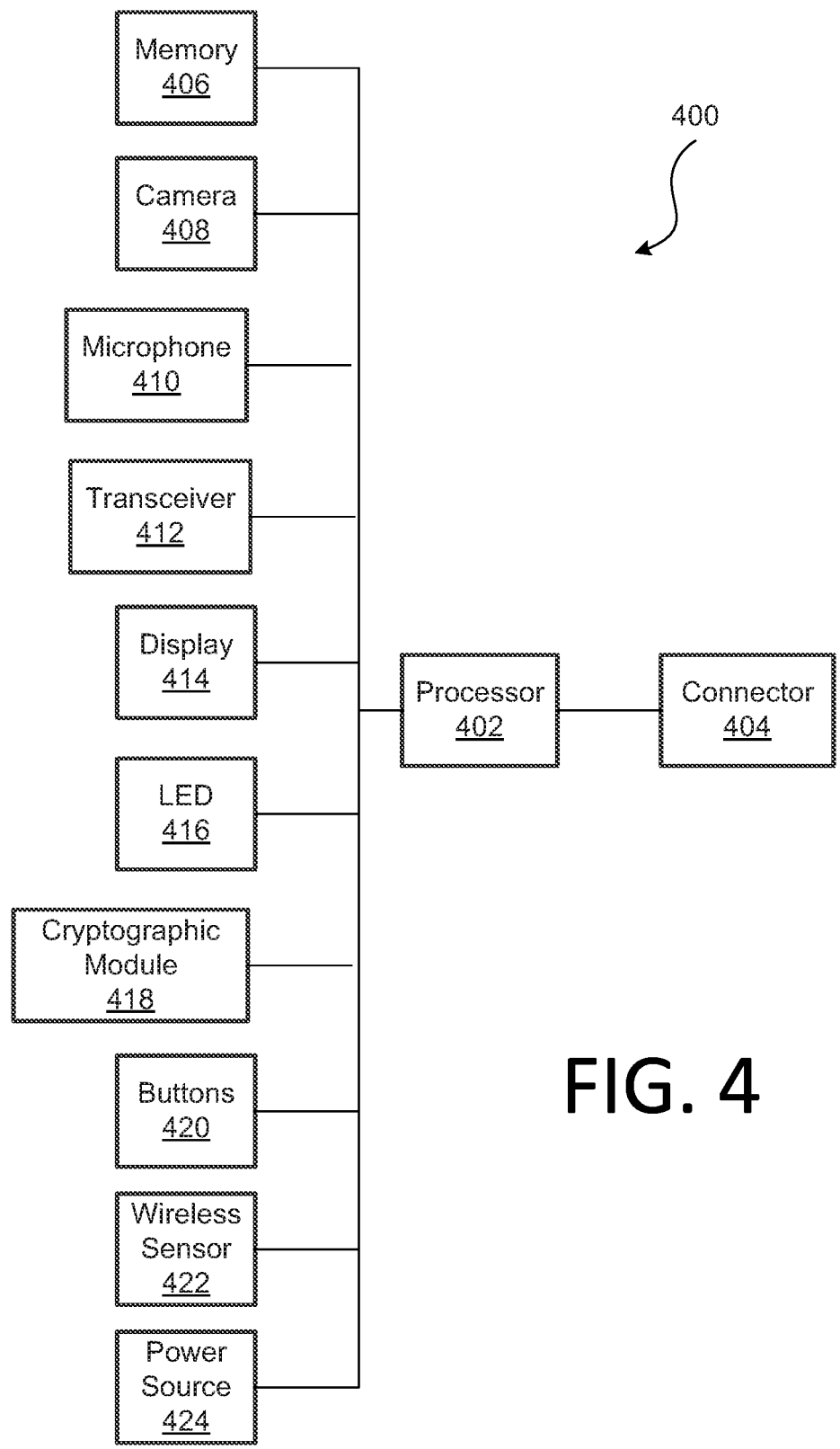
FIG. 4 illustrates an example block diagram of an intermediary trusted gaming device.

FIG. 4 illustrates an example block diagram of an intermediary trusted gaming device. The intermediary trusted gaming device 400 may have a processor 402 configured to communicate with connector 404. Processor 402 may be configured to receive and transmit gaming information via connector 404 from and to the PED. Processor 402 may also be configured to communicate with a camera 408, microphone 410, LED 416, display 414, and buttons or switches 420. As stated above with reference to FIG. 2B, camera 408 may be used to authenticate or verify the user. Once a picture of the player is taken using camera 408, processor 402 may process the picture to authenticate or verify the player. Additionally, processor 402 may process the input associated with selected buttons 420 or display the desired message or indicia on display 414. As stated above with reference to FIG. 2C, microphone 410 may also be used to authenticate or verify the user. Once the player's voice is captured by the intermediary trusted gaming device 400 via microphone 410, processor 402 may process the player's voice to authenticate or verify the player. Additionally, processor 402 may be configured to control LED 416 as described above with reference to FIG. 2A.

Intermediary trusted gaming device 400 may also have at least one transceiver 412. In one embodiment, the intermediary trusted gaming device 400 may have a long-range transceiver, short-range transceiver, or both. The transceiver 412 may be designed to locate the position of the intermediary trusted gaming device 400 through use of any known positioning methods as discussed in detail above. As stated above, intermediary trusted gaming device 400 may communicate wirelessly and therefore may have a wireless sensor 422.

Intermediary trusted gaming device 400 may have at least one memory 406. The memory 406 may be any type of memory configured to store gaming applications, game logic, game session data, authentication software, and the like. For example, the memory may be a non-volatile random access memory (NVRAM), flash memory, dynamic random access memory ("DRAM")), and the like.

The intermediary trusted gaming device 400 may have a power source 424. The power source 424 may be any known power source such as a battery and may be powered through any known means. For example, the power source 424 may be powered when physically connected to a PED or plugged into a power outlet. When the power source 424 is an internal battery, it maybe recharged when connected to an external power source such as a power outlet. Having an internal battery onboard the intermediary trusted device 400 may maintain communication to another device in the network such as a location server or a game server even when the PED is not powered on. In one embodiment, the intermediary trusted device 400's connection to the location server persists so that its location can be accounted for at all time.

In one embodiment, intermediary trusted gaming device 400 may also have a cryptographic module 418 to decrypt communication received from a gaming server and/or PED and to encrypt communication transmitted to the PED and/or gaming server.

Figure 5A:
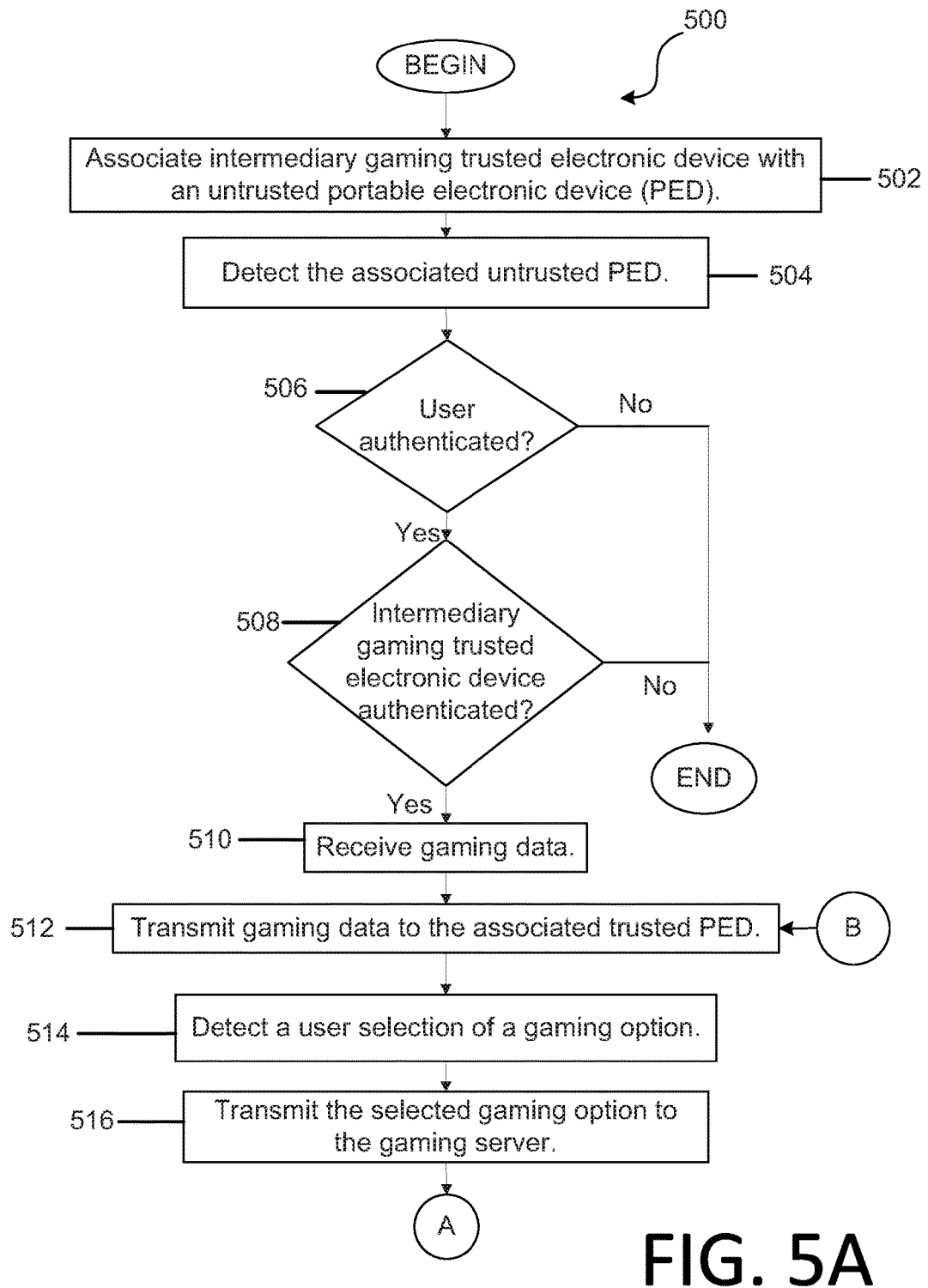
FIGS. 5A and 5B illustrate example methods for playing games of chance using an intermediary gaming trusted device.
Figure 5B:
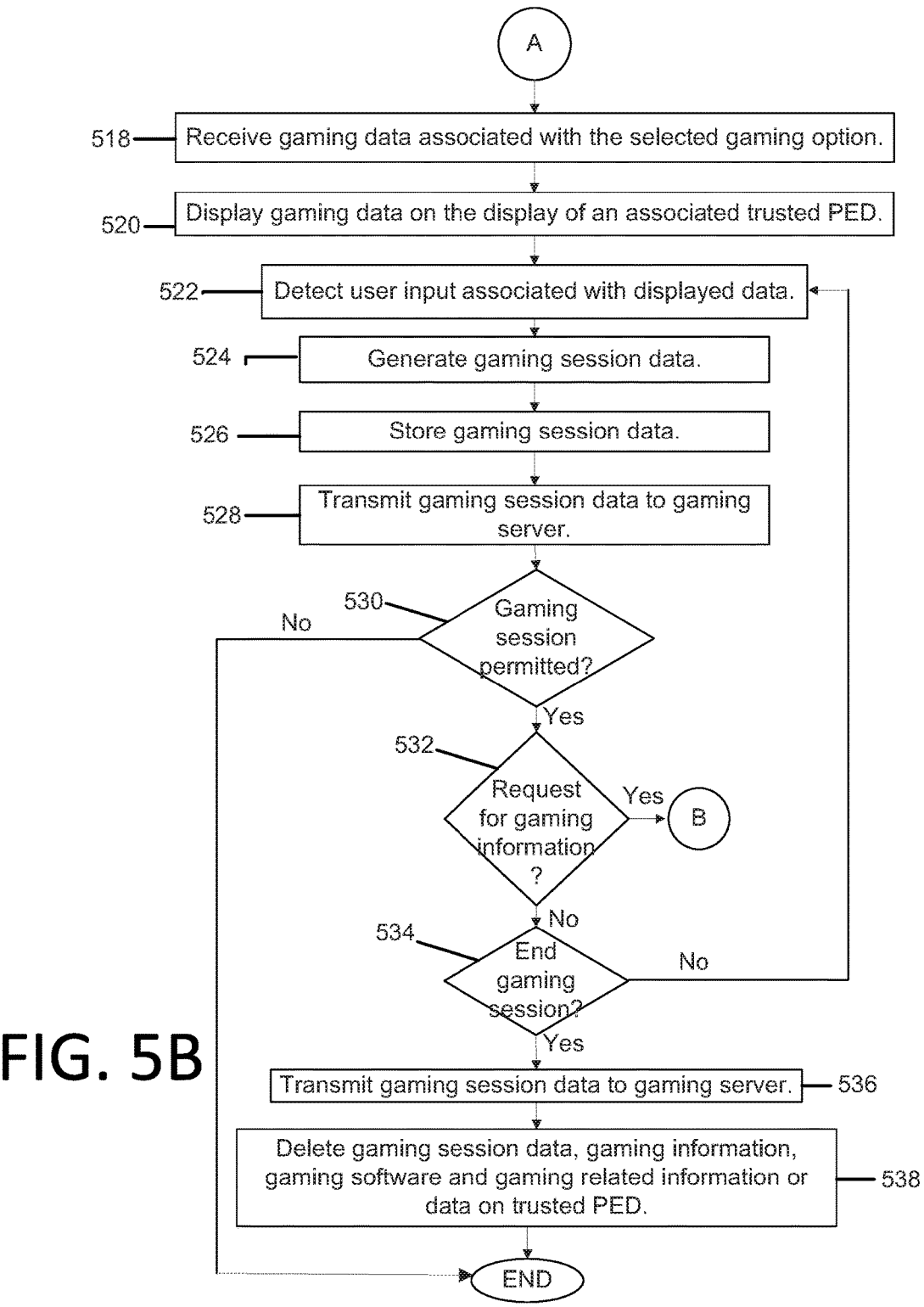

FIGS. 5A and 5B illustrate example methods for playing games of chance using an intermediary gaming trusted device. Referring to FIG. 5A, the method 500 initially begins with associating an intermediary gaming trusted device with an untrusted PED at 502. The association may occur through any known association methods. For example, the gaming establishment personnel may manually associate the intermediary gaming trusted device with the untrusted PED. In another example, the intermediary gaming trusted device may be physically coupled to the untrusted PED.

The associated untrusted PED may be detected at 504 by the intermediary gaming trusted device. If physically coupled to the untrusted PED, detection of the untrusted PED may occur when the intermediary gaming trusted device is coupled to the PED via the connector of the intermediary gaming trusted device. If communication of the untrusted PED is wireless, detection may occur when the intermediary gaming trusted device connects wirelessly with the untrusted PED.

A determination of whether the user of the untrusted PED is authenticated is made at 506. If the user is not authenticated, the method 500 may end. Authentication and/or verification of the user may be through any known authentication and verification methods such as, for example, biometric verification (i.e. voice recognition, retinal scan, fingerprint verification, and the like), username, password, account number, and the like. Authentication of the user may also include authentication via a web-application associated with the gaming establishment and/or uploading authentication software from the intermediary gaming trusted device to the untrusted PED. In another embodiment, the user of the untrusted PED may also obtain the intermediary gaming trusted device from a gaming establishment personnel. The gaming establishment personnel may then authenticate and/or verify the user as well as associate the intermediary gaming trusted device to the untrusted PED.

If the user of the untrusted PED is authenticated, the intermediary gaming trusted device may be authenticated at 508. If the intermediary gaming trusted device is not authenticated, the method 500 may end. Authentication of the intermediary gaming trusted device may be made by any known means. For example, a unique identifier of the intermediary gaming trusted device may be compared to identifiers stored at a gaming server. In one embodiment, the intermediary gaming trusted device may automatically connect to the gaming server and authenticate itself when turned on or powered up.

If the intermediary gaming trusted device is authenticated at 508, the intermediary gaming trusted device may receive gaming data at 510 from a gaming server. The gaming data may include a plurality of options. The gaming data may include gaming information or gaming establishment information. Gaming information may include, for example, player tracking information, gaming options, data to play a game of chance, funding information or options in order to play the games of chance, pay tables, and the like. The gaming establishment information may include, for example, advertisements (e.g. buffet coupons, movie trailers, and the like), tournament information, room booking information, entertainment information, and the like.

The untrusted PED becomes or is otherwise transformed into a trusted PED and the gaming data may then be transmitted to the associated trusted PED. As stated above, the gaming data may include a plurality of gaming options, such as, for example, a list of games of chance the user may select to play. The games of chance may be any game of chance such as blackjack, poker, roulette, craps, bingo, keno, video slot machines, and the like. Each list may also include a logo or any other indicia with each option, a summary of what the option is, a number of times the player has played each game of chance, the last time the selection was made by the player, or any other desired information.

A selection of one of the gaming options may be detected at 514. For example, the player may want and select to play a game of black jack. In one embodiment, selection of one of the gaming options may be executed by the user on the trusted PED. In another embodiment, selection of one of the gaming options may be selected on the intermediary gaming trusted device. Once a selection has been made, the intermediary gaming trusted device may transmit the selected gaming option to the gaming server at 516.

Referring now to FIG. 5B, gaming data associated with the selected gaming option may be received at 518 by the intermediary gaming trusted device. For example, gaming data to play black jack may be received if the black jack option was selected. The gaming data may then be transmitted to the associated trusted PED for display on a display of the associated trusted PED at 520. Once displayed, any input associated with the displayed data may be detected at 522. For example, if the data displayed was to play a game of chance, inputs associated with playing the game of chance may be detected such as a wagering amount, spin, hold, and the like. In another example, if the data displayed was a poker tournament, the input may be to register for the tournament. In still another example, if the displayed data was a coupon to the buffet, the input may be to add the coupon to the player tracking account, print the coupon, or a cancel the coupon. The user input may be detected from the PED or the intermediary gaming trusted device.

If the displayed data was to play a game of chance, the gaming session data may be generated at 524. In one embodiment, the intermediary gaming trusted device may generate the gaming session data at 524. For instance, the number of games played, by whom, where and when, and the aggregate amount of wager since the start of the game session maybe calculated and recorded by the intermediary gaming trusted device. In still another embodiment, the gaming session data may be generated from the gaming server and transmitted to the intermediary gaming trusted device. For instance, a random bonus amount and the associated triggering event maybe generated by the gaming server and sent to the intermediary gaming trusted device. In yet another embodiment, the gaming session data maybe generated from the user's inputs at the PED during the gaming session. Gaming session data may include any information the user inputs while playing a game, number of wins or losses, amount of funds remaining or added, clicking on advertisements, and any other gaming information generated during the game session. The gaming session data may be stored at 526. The gaming session data may be stored on the intermediary gaming trusted device periodically or dynamically in real-time. For example, the gaming session data may be stored or saved at predefined intervals such as every minute, every hour, every ten (10) seconds, and the like. In another example, the gaming session data may be stored dynamically as the gaming session data is generated.

The gaming session data may be transmitted to the gaming server at 528. The gaming session data may be transmitted to the gaming server periodically or dynamically in real-time. For example, the gaming session data may be buffered and transmitted at predefined intervals such as every minute, every hour, every ten (10) seconds, and the like. In another example, the gaming session data may be transmitted dynamically in real-time as the gaming session data is generated.

A determination of whether the gaming session is still permitted is made at 530. Gaming sessions may be permitted based on various factors such as location of the intermediary gaming trusted device, duration of play, time of day, user information, gaming regulations, amount played, and the like. For example, if the intermediary gaming trusted device is determined to be in the parking lot where playing games of chance are not permitted, the gaming session will end and the intermediary gaming trusted device may cease to perform any gaming activities. In another example, if gaming regulations prohibit game play after the loss of $500 within a 24-hr period, the gaming session will end and the intermediary gaming trusted device may cease to perform any gaming activities.

If the gaming session is permitted at 530, a determination of whether gaming information is requested is made at 532. If a request for gaming information is detected at 532, the intermediary gaming trusted device may transmit the request to the gaming server and the method 500 may continue at step 512 of FIG. 5A. If a request for gaming information is not detected or not permitted at 532, a determination of whether the gaming session ends is made at 534. For example, if a cash-out input was detected, the gaming session may end. In another example, if the PED has been determined to have been moved out of the allowed area, the gaming session may also end. In yet another example, if there are no credits to play the game of chance, the gaming session may end. If the gaming session did not end at 534, the method may continue at step 522.

If the gaming session is determined to end at 534, the gaming session data may be transmitted to the gaming server at 536. Once the gaming session data is transmitted to the gaming server at 536, all gaming session data, gaming data, gaming software, and any other gaming related information and data are deleted from the associated trusted PED at 538. All gaming related information and data are deleted from the associated trusted PED to prevent fraud, hacking, and the like.

Figure 6:
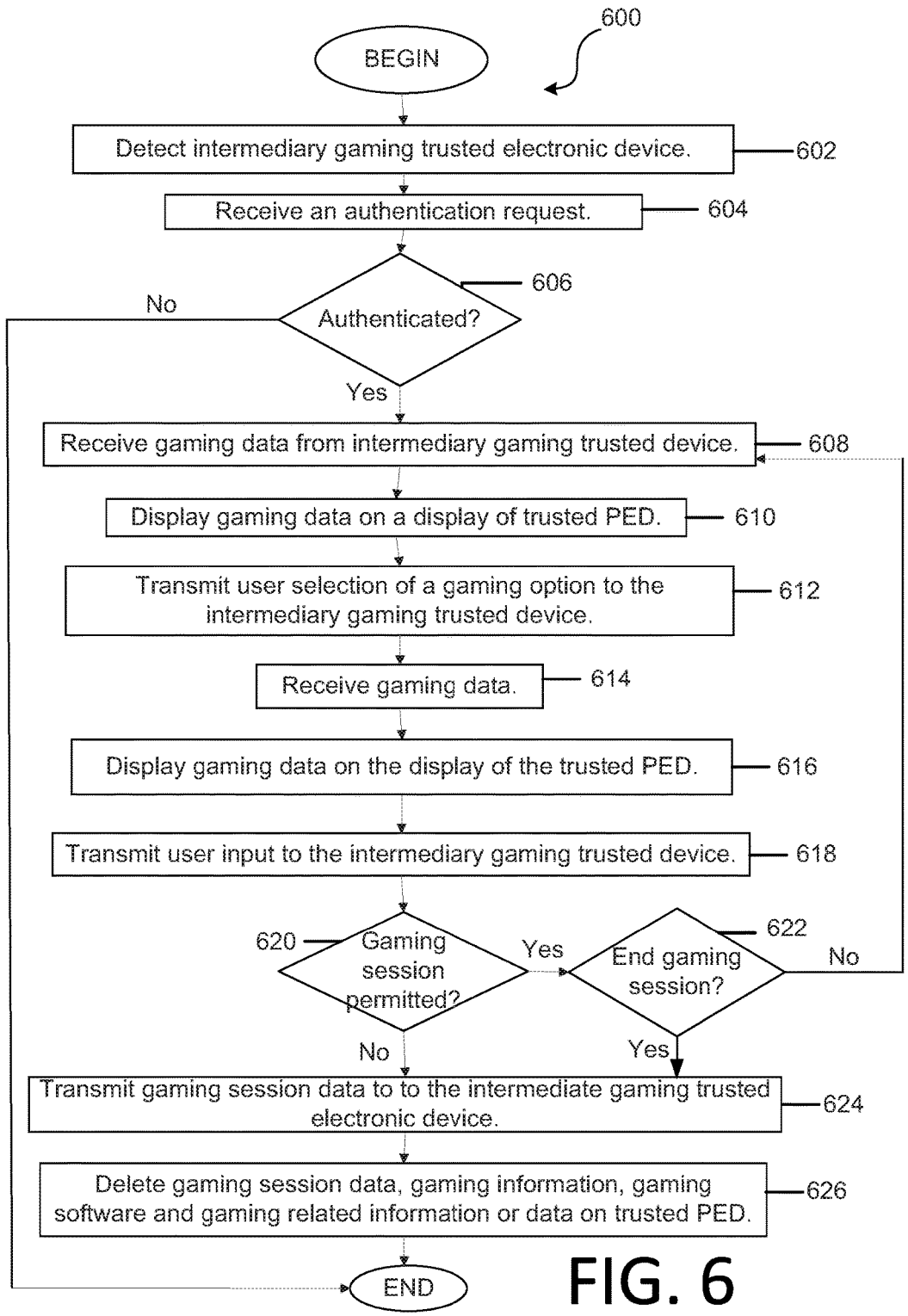
FIG. 6 illustrates an example method for playing a game of chance on a portable electronic device.

FIG. 6 illustrates an example method for playing a game of chance on a portable electronic device. The PED may be connected to an intermediary gaming trusted device to convert or otherwise transform an untrusted PED to a trusted PED to play games of chance and/or receive gaming related information. The method 600 initially begins with detection of the intermediary gaming trusted electronic device at 602. If physically coupled to the untrusted PED, detection of the intermediary gaming trusted device occurs when it is coupled to the PED via a connector, wire, or any other means. If communication with the intermediary gaming trusted device is wireless, detection may occur when the untrusted PED connects wirelessly with the intermediary gaming trusted device.

An authentication and/or verification request may be received at 604. The untrusted PED may receive the authentication request form detected intermediary gaming trusted electronic device. Authentication and/or verification of the user may be through any known authentication and verification methods such as, for example, biometric verification (i.e. voice recognition, retinal scan, fingerprint verification, and the like), username, password, account number, and the like. Authentication of the user may also include authentication via a web-application associated with the gaming establishment and/or uploading authentication software from the intermediary gaming trusted device to the untrusted PED. In another embodiment, the user of the untrusted PED may also obtain the intermediary gaming trusted device from a gaming establishment personnel. The gaming establishment personnel may then authenticate and/or verify the user as well as associate the intermediary gaming trusted device to the untrusted PED. In still another embodiment, the authentication request may require the untrusted PED to download software or an authentication application. The software may request the user of the untrusted PED to input authentication and/or verification information to authenticate and/or verify the user.

If the untrusted PED is not authenticated at 606, the intermediary gaming trusted device will cease to perform any tasks and the method 600 may end. If the untrusted PED is authenticated at 606, the untrusted PED then becomes or is otherwise converted to a trusted PED. The trusted PED may then receive gaming data from the intermediary gaming trusted electronic device at 608. The gaming data may have a plurality of gaming options. The gaming data may include gaming information or gaming establishment information. Gaming information may include, for example, player tracking information, gaming options, data to play a game of chance, funding information or options in order to play the games of chance, pay tables, and the like. The gaming establishment information may include, for example, advertisements (e.g. buffet coupons, movie trailers, and the like), tournament information, room booking information, entertainment information, and the like. The gaming options may include a list of games of chance the player may like to play such as, blackjack, poker, video slot machines, video games, keno, and the like. Each list may also include a logo or any other indicia with each option, a summary of what the option is, a number of times the player has played each game of chance, the last time the selection was made by the player, or any other desired information.

The gaming data may then be displayed on a display of the trusted PED at 610. The user of the trusted PED may select an option associated with the displayed gaming data which is then transmitted to the intermediary gaming trusted device at 612. The selection may be made using the trusted PED and/or the intermediary gaming trusted device. For example, if the gaming data was a list of games of chance the play may play, the list may be displayed on the display of the trusted PED and the use may select one of the games of chance to play. The selected game of chance may be transmitted to the intermediary gaming trusted device. In another example, if the gaming data was a coupon for the buffet, the option may be to accept or decline the coupon which the user may select. The selection may then be transmitted to the intermediary gaming trusted device.

If the user selected a game of chance to play using the trusted PED, gaming data may be received at 614 to start a gaming session for the player. The gaming data may be associated with the selected game of chance. For example, gaming data to play black jack may be received if the black jack option was selected. The gaming data may then be transmitted to the associated trusted PED for display on a display of the associated trusted PED at 616. Once displayed, any input associated with the displayed gaming data may be detected and transmitted to the intermediary gaming trusted device at 618. For example, if the data displayed was to play a game of chance, inputs associated with playing the game of chance may be detected such as a wagering amount, spin, hold, and the like. In another example, if the data displayed was a poker tournament, the input may be to register for the tournament. In still another example, if the displayed data was a coupon to the buffet, the input may be to add the coupon to the player tracking account, print the coupon, or a cancel the coupon. The user input may be detected from the PED or the intermediary gaming trusted device.

A determination of whether the gaming session is permitted is made at 620. Gaming sessions may be permitted based on various factors such as location of the intermediary gaming trusted device, duration of play, time of day, user information, gaming regulations, amount played, and the like. For example, if the intermediary gaming trusted device is determined to be in the parking lot where playing games of chance are not permitted, the gaming session will end and the intermediary gaming trusted device may cease to perform any gaming activities. In another example, if gaming regulations prohibit game play after the loss of $500 within a 24-hr period, the gaming session will end and the intermediary gaming trusted device may cease to perform any gaming activities.

If the gaming session is permitted at 620, a determination of whether the gaming session should end is made at 622. For example, if a cash-out input was detected, the gaming session may end. In another example, if the PED has been determined to have been moved out of the allowed area, the gaming session may also end. In yet another example, if there are no credits to play the game of chance, the gaming session may end. If the gaming session did not end at 622, the method may continue at step 608.

If the gaming session is determined to end at 622, the gaming session data may be transmitted to the intermediary gaming trusted device at 624. Once the gaming session data is transmitted to the intermediary gaming trusted device at 624, all gaming session data, gaming data, gaming software, and any other gaming related information and data are deleted from the associated trusted PED at 626. All gaming related information and data are deleted from the associated trusted PED to prevent fraud, hacking, and the like.

Figure 7:
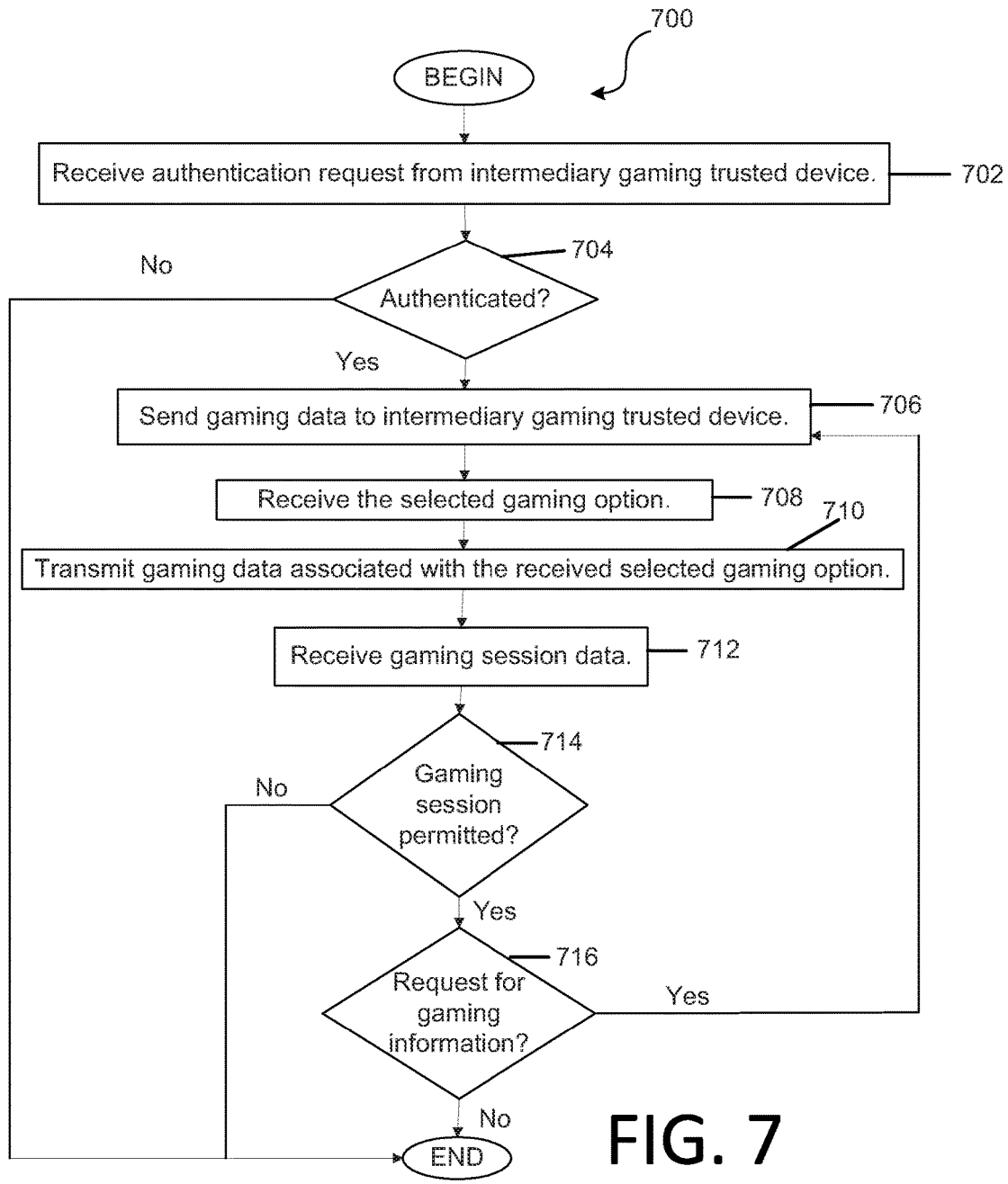
FIG. 7 illustrates an example method for playing a game of chance on a portable electronic device.

FIG. 7 illustrates an example method for playing a game of chance on a portable electronic device. The PED may be configured to communicate with an intermediary gaming trusted device which is configured to communicate with a server. Use of the intermediary gaming trusted device converts an unknown and untrusted PED to a trusted PED to create a controlled and secure environment where a player may play games of chance or obtain gaming data. The method 700 initially begins when a gaming server receives an authentication request from the intermediary gaming trusted device at 702. The request may be to authenticate the unknown and untrusted PED and/or authenticate the intermediary gaming trusted device. If neither the untrusted PED and/or intermediary gaming trusted device are authenticated at 704, the method 700 may end.

Authentication and/or verification of the untrusted PED may be through any known authentication and verification methods such as, for example, biometric verification (i.e. voice recognition, retinal scan, fingerprint verification, and the like) of the user, username, password, account number, device identifier, digital signature of the operating system and/or the software application, and the like. Authentication of the untrusted PED may also include authentication via a web-application associated with the gaming establishment and/or uploading authentication software from the intermediary gaming trusted device to the untrusted PED. The information received by the gaming server may be authenticated with information stored in a database, such as, for example, a player tracking base 110 illustrated in FIG. 1. Similarly, the intermediary gaming trusted device may have a unique identifier that may be compared to identifiers stored at the gaming server.

Once authenticated at 704, gaming data may be sent to the intermediary gaming trusted device at 706. The gaming data may include gaming information or gaming establishment information. Gaming information may include, for example, player tracking information, gaming options, data to play a game of chance, funding information or options in order to play the games of chance, pay tables, and the like. The gaming establishment information may include, for example, advertisements (e.g. buffet coupons, movie trailers, and the like), tournament information, room booking information, entertainment information, and the like. The gaming data may include a plurality of gaming options, such as, for example, a list of games of chance the user may select to play. The games of chance may be any game of chance such as blackjack, poker, roulette, craps, sicbo, bingo, keno, video slot machines, and the like. Each list may also include a logo or any other indicia with each option, a summary of what the option is, a number of times the player has played each game of chance, the last time the selection was made by the player, or any other desired information.

A selected gaming option may be received at 708 from the intermediary gaming trusted device. Gaming data associated with the received selected gaming option may be transmitted at 710 to the intermediary gaming trusted device. For example, if the received selected gaming option is to play black jack, the transmitted gaming data may be associated with black jack. In another example, if the selected gaming option is to obtain movie tickets, the gaming data may be a list of movies playing at the theater.

The gaming server may periodically or dynamically receive gaming session data at 712 from the intermediary gaming trusted device. Gaming session data may be any session data resulting from playing a game of chance such as number of wins or losses, amount of funds remaining or added, clicking on advertisements, and any other gaming information generated during the game session. The gaming session data may be received periodically or dynamically in real-time. For example, the gaming session data may be received at predefined intervals such as every minute, every hour, every ten (10) seconds, and the like. In another example, the gaming session data may be received dynamically in real-time as the gaming session data is generated.

A determination of whether the gaming session is permitted is made at 714. Gaming sessions may be permitted based on various factors such as location of the intermediary gaming trusted device, duration of play, time of day, user information, gaming regulations, amount played, and the like. For example, if the intermediary gaming trusted device is determined to be in the parking lot where playing games of chance are not permitted, the gaming session will end and the intermediary gaming trusted device may cease to perform any gaming activities. In another example, if gaming regulations prohibit game play after the loss of $500 within a 24-hr period, the gaming session will end and the intermediary gaming trusted device may cease to perform any gaming activities.

In no gaming session is permitted at 714, the method 700 may end. If the gaming session is permitted at 714, a determination of whether gaming information is requested is made at 716. If a request for gaming information is detected at 716, the method may return to step 706. If a request for gaming information is not detected at 716, the method 700 may end.

While embodiments and applications of this invention have been shown and described, it would be apparent to those skilled in the art having the benefit of this disclosure that many more modifications than mentioned above are possible without departing from the inventive concepts herein.

What is claimed is:

1. A portable intermediary gaming trusted device for use with an associated untrusted portable electronic device (PED), the device comprising:
   a position sensor configured to acquire position information of the associated untrusted PED;
   a memory configured to store at least game session data;
   a wireless transceiver; and
   a processor configured to at least:
      securely communicate with a gaming apparatus, the gaming apparatus able to receive or process a wager to play a game of chance;
      securely communicate with the associated untrusted PED;
      determine whether a gaming session for one or more games of chance is active;
      receive gaming data pertaining to the gaming session if it is determined that the gaming session is active; and
      enable the associated untrusted PED to display presentation data on a display of the associated untrusted PED, the presentation data being associated with the gaming data,
   wherein the associated untrusted PED changes to a trusted device to display presentation data so long as the portable intermediary gaming trusted device is operatively coupled to the associated untrusted PED.

2. A portable intermediary gaming trusted device as recited in claim 1, wherein the gaming data comprises an amount of funds remaining or added.

3. A portable intermediary gaming trusted device as recited in claim 1, wherein the gaming data comprises player tracking information.

4. A portable intermediary gaming trusted device as recited in claim 1, wherein the gaming data comprises gaming options.

5. A portable intermediary gaming trusted device as recited in claim 1, wherein the gaming data comprises funding information for the wager-based game of chance.

6. A system for playing a wagering game of chance, the system supporting a portable electronic device (PED) having a display to display presentation data associated with gaming data based on the wagering game of chance, the system comprising:
   a portable intermediary gaming trusted device configured to securely communicate with the PED via a physical connection or a short-range wireless network; and
   a gaming server configured to securely communicate with the portable intermediary gaming trusted device to determine whether the PED is permitted to participate in a gaming session pertaining to a wager-based game of chance; and configured to transmit gaming data to the PED and receive user inputs from the PED so long as the PED is permitted to participate in the gaming session pertaining to a wager-based game of chance,
   wherein the portable intermediary gaming trusted device is at least periodically in communication with the gaming server in order for the PED to participate in the gaming session pertaining to a wager-based game of chance.

7. A system as recited in claim 6, wherein, while the PED is participating in the gaming session pertaining to a wager-based game of chance, a wager for the wager-based game of chance can be receive at the gaming server via the PED or the portable intermediary gaming trusted device.

8. A system as recited in claim 6, wherein the portable intermediary gaming trusted device is configured to enable transmission of the gaming data to the PED to allow the PED to present at least a portion of the gaming data.

9. A system as recited in claim 6, wherein, while the PED is permitted to participate in the gaming session pertaining to the wager-based game of chance, the gaming server is configured to transmit of the gaming data to the PED to allow the PED to present at least a portion of the gaming data.

10. A system as recited in claim 6, wherein the gaming data comprises an amount of funds remaining or added.

11. A system as recited in claim 6, wherein the gaming data comprises player tracking information.

12. A system as recited in claim 6, wherein the gaming data comprises gaming options.

13. A system as recited in claim 6, wherein the gaming data comprises funding information for the wager-based game of chance.

14. A system as recited in claim 6, wherein at least one of the portable intermediary gaming trusted device and the gaming server generate gaming session data.

15. A system as recited in claim 6, wherein the user input comprises a wager amount.

16. A system for playing a wagering game of chance, the system supporting a portable electronic device (PED) having a display to display gaming data based on the wagering game of chance, the system comprising:

a portable intermediary gaming trusted device configured to securely communicate with the PED via a physical connection or a short-range wireless network; and a gaming apparatus configured to securely communicate with the portable intermediary gaming trusted device to determine whether the PED is permitted to participate in a gaming session pertaining to a wager-based game of chance; and configured to transmit gaming data to the PED so long as the PED is permitted to participate in the gaming session pertaining to a wager-based game of chance, wherein the portable intermediary gaming trusted device is at least periodically in communication with the gaming apparatus in order for the PED to remain permitted to participate in the gaming session pertaining to a wager-based game of chance.

17. A system as recited in claim 16, wherein the gaming apparatus has a connection port, and wherein the portable intermediary gaming trusted device physically connects to the gaming apparatus via the connection port.

18. A system as recited in claim 16, wherein the portable intermediary gaming trusted device configured to securely communicate with a plurality of portable electronic devices via the short-range wireless network.

19. A system as recited in claim 16, wherein the gaming apparatus is a gaming machine.

20. A system as recited in claim 16, wherein the gaming data comprises an amount of funds remaining or added.

21. A system as recited in claim 16, wherein the gaming data comprises player tracking information.

22. A system as recited in claim 16, wherein the gaming data comprises gaming options.

23. A system as recited in claim 16, wherein the gaming data comprises funding information for the wager-based game of chance.

24. A system as recited in claim 16, wherein at least one of the portable intermediary gaming trusted device and the gaming apparatus generate gaming session data.

25. A portable intermediary gaming trusted device for use with an associated untrusted portable electronic device (PED), the device comprising:

a position sensor configured to acquire position information of the associated untrusted PED;

a memory configured to store at least game session data;

a wireless transceiver; and a processor configured to at least:

securely communicate with a gaming apparatus, the gaming apparatus able to receive or process a wager to play a game of chance;

securely communicate with the associated untrusted PED;

determine whether a gaming session for one or more games of chance is requested;

receive gaming data and user inputs pertaining to the gaming session if it is determined that the gaming session is requested; and enable the associated untrusted PED to start the gaming session, the gaming session being associated with the gaming data, wherein the associated untrusted PED changes to a trusted device to carry out the gaming session so long as the portable intermediary gaming trusted device is operatively coupled to the associated untrusted PED.

26. A portable intermediary gaming trusted device as recited in claim 25, wherein the user input comprises a wager amount.

27. A portable intermediary gaming trusted device as recited in claim 25, wherein the processor is configured to generate game session data.

* * * * *